US008307326B2

(12) United States Patent (10) Patent No.: US 8,307,326 B2
Kobayashi et al. (45) Date of Patent: Nov. 6, 2012

(54) METHOD AND APPARATUS FOR SUPPORTING APPLICATION ENHANCEMENT

(75) Inventors: Kenichi Kobayashi, Kawasaki (JP); Akihiko Matsuo, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 481 days.

(21) Appl. No.: 12/656,149

(22) Filed: Jan. 19, 2010

(65) Prior Publication Data

US 2010/0125824 A1 May 20, 2010

Related U.S. Application Data

(63) Continuation of application No. PCT/JP2007/064252, filed on Jul. 19, 2007.

(51) Int. Cl.
*G06F 9/44* (2006.01)
*G06F 9/45* (2006.01)

(52) U.S. Cl. .................. 717/104; 717/110; 717/151

(58) Field of Classification Search .......... 717/104–113, 717/151–158; 718/104
See application file for complete search history.

(56) References Cited

U.S. PATENT DOCUMENTS

| 5,889,999 | A | * | 3/1999 | Breternitz et al. ............ 717/158 |
| 5,978,588 | A | * | 11/1999 | Wallace ........................ 717/159 |
| 7,620,964 | B2 | * | 11/2009 | Kushida et al. ................ 725/14 |
| 2003/0101444 | A1 | * | 5/2003 | Wu et al. ....................... 717/161 |
| 2003/0237080 | A1 | * | 12/2003 | Thompson et al. ............ 717/161 |
| 2007/0209031 | A1 | * | 9/2007 | Ortal et al. .................... 717/104 |
| 2007/0256054 | A1 | * | 11/2007 | Byrne et al. ................... 717/113 |
| 2008/0301691 | A1 | * | 12/2008 | Mamagkakis et al. ........ 718/104 |
| 2010/0131916 | A1 | * | 5/2010 | Prigge ........................... 717/104 |
| 2011/0161924 | A1 | * | 6/2011 | Alexander et al. ............ 717/109 |

FOREIGN PATENT DOCUMENTS

| JP | 06-266550 | 9/1994 |
| JP | 2001-325100 | 11/2001 |
| JP | 2004-295425 | 10/2004 |
| JP | 2006-302135 | 11/2006 |
| JP | 2007-156820 | 6/2007 |

OTHER PUBLICATIONS

Kenichi Kobayahi et al., "Predicting fault-proneness of legacy systems based on change impact", IEIEC Technical Report, vol. 105, No. 491, The Institute of Electronics, Information and Communication Engineers, Dec. 13, 2005, pp. 31-36.
Katsuhiko Hatano et al., "A Mechanism to Support Automated Refactoring Process Using Software Metrics", Transactions of Information Processing Society of Japan, vol. 44, No. 6, Information Processing Society of Japan, Jun. 15, 2003, pp. 1548-1557.
Shinepi Hayashi et al., "A Technique for Supporting Refactoring Based on Program Modification", IECE Technical Report, vol. 104, No. 242, The Institute of Electronics, Information and Communication Engineers, Jul. 26, 2004, pp. 13-18.
Written Opinion of corresponding International Application PCT/JP2007/064252,filed Jul. 19, 2007.
International Search Report for corresponding International Application PCT/JP2007/064252; mailed Aug. 21, 2007.
Japanese Office Action mailed May 15, 2012 issued in corresponding Japanese Patent Application No. 2009-523494.

* cited by examiner

*Primary Examiner* — Christopher B Shin
(74) *Attorney, Agent, or Firm* — Staas & Halsey LLP

(57) ABSTRACT

A method includes generating an application model that represents a relation of connection based on a control flow relation and a data dependency relation between a module and data constituting an application, by analyzing a source code, evaluating complexity of the relation of connection that is represented by the application model generated in the generating, and outputting an enhancement point used in reducing the complexity evaluated in the evaluating.

18 Claims, 27 Drawing Sheets

FIG.10
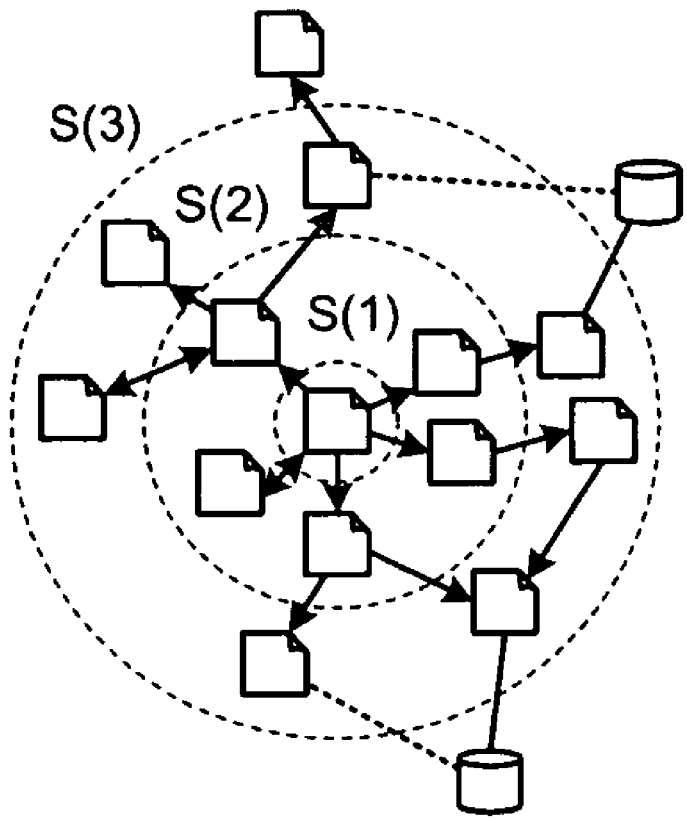
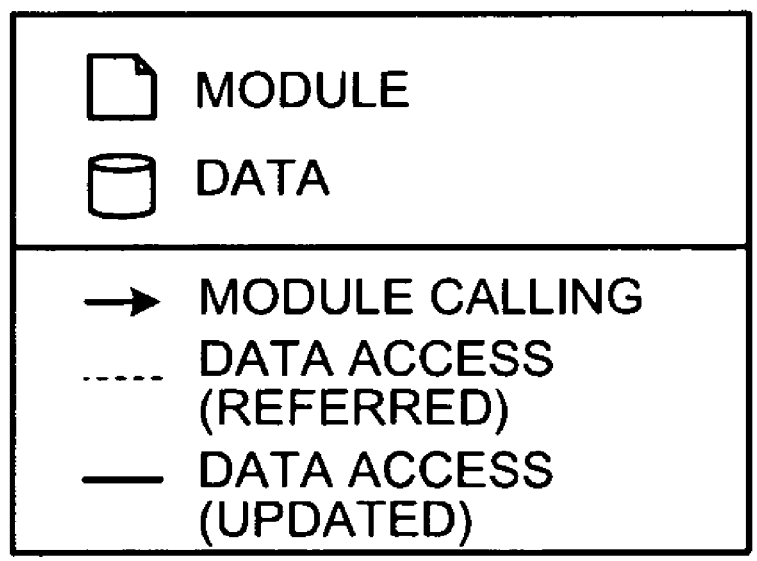

FIG.11A
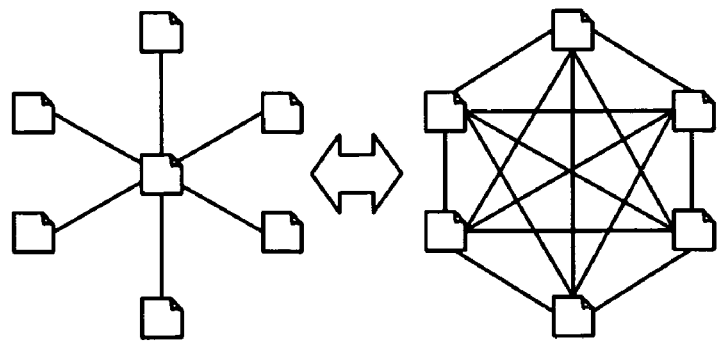
IMPACT SCALE: 27    IMPACT SCALE: 30
*FOR α =0.5
LARGE IMPACT SCALE=
DIFFICULTY IN MAINTENANCE
FIG.11B
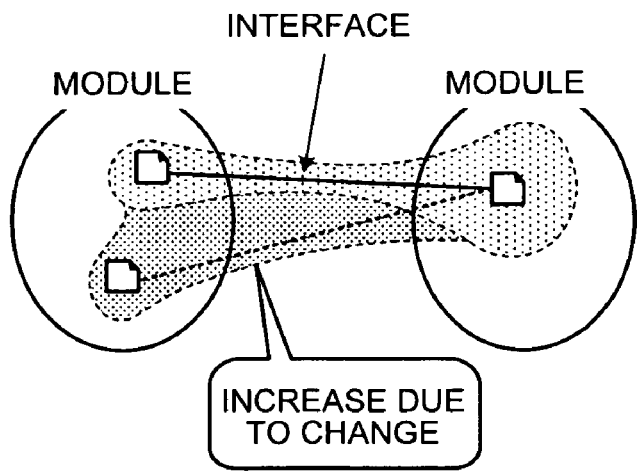
INCREASE DUE
TO CHANGE
INCREASE IN IMPACT SCALE=
DECLINE IN MAINTAINABILITY

ARCHITECTURAL COMPLEXITY (IMPACT SCALE) OF APPLICATION MODEL=53.0

FIG.15

REFACTORING SEQUENCE INFORMATION

| REFACTORING ID | TARGET GRAPH CONDITIONS FOR MANIPULATION | GRAPH MANIPULATING PROCEDURE |
|---|---|---|
| 1 | ·LINK IS CONSIDERED AS TARGET<br>·NODES ON BOTH ENDS OF TARGET LINK ARE CONNECTED BY DIFFERENT PATH NOT INCLUDING TARGET LINK | ·TARGET LINK IS CUT |
| 2 | ·TWO ADJACENT NODES ARE CONSIDERED AS TARGETS<br>·ALL NODES ADJACENT TO EACH TARGET NODE ARE IDENTICAL<br>·ALL LINKS FROM EACH TARGET NODE TO CORRESPONDING ADJACENT NODES ARE OF IDENTICAL TYPE | ·TWO TARGET NODES ARE MERGED |

⋮

METHOD AND APPARATUS FOR SUPPORTING APPLICATION ENHANCEMENT

CROSS-REFERENCE TO RELATED APPLICATION(S)

This application is a continuation of International Application No. PCT/JP2007/064252, filed on Jul. 19, 2007, the entire contents of which are incorporated herein by reference.

FIELD

The embodiments discussed herein are directed to a method, an apparatus, and a program for analyzing the source code of an application and providing application enhancement supporting information.

BACKGROUND

The task of executing a large-scale application over an extended period of time includes performing changes to the application in response to changes in the specification or in response to failures. As a result, the application becomes increasingly complex over time, which makes it difficult to wholly overlook the application and causes decline in the maintainability. For this reason, a maintenance task known as refactoring needs to be performed on the application. For example, for a core business application of a bank or the like, the need for refactoring is critically high because of the largeness of its scale and the length of its maintenance period.

Because of the largeness of the scale of an application, such refactoring weighs heavily on the operator. Given that factor, development of refactoring supporting technology is being pursued. For example, Japanese Laid-open Patent Publication No. 2004-295425 discloses a technology in which a metrics is obtained regarding each individual module of an application and modules of inferior quality are identified and then specified as candidate modules for refactoring. Moreover, Japanese Laid-open Patent Publication No. 06-266550 and Japanese Laid-open Patent Publication No. 2001-325100 disclose a technology in which the complexity of each individual program is evaluated based on the variables used in that program.

However, although such conventional technology enables evaluation of the complexity of modules on an individual basis and identification of those modules as targets for refactoring, no support is provided to the refactoring at the architecture level of an entire application. On the one hand, refactoring performed at the architecture level on an entire application is highly effective, i.e., produces a greater impact; while on the other hand, it is difficult to find locations for enhancement in order to achieve reduction in the complexity of the entire application. Moreover, even if locations for enhancement are found, it is important that the enhancement impact be quantitatively evaluable in advance. However, evaluating the enhancement impact in advance is also a difficult task.

SUMMARY

According to an aspect of an embodiment of the invention, a method includes generating an application model that represents a relation of connection based on a control flow relation and a data dependency relation between a module and data constituting an application, by analyzing a source code, evaluating complexity of the relation of connection that is represented by the application model generated in the generating, and outputting an enhancement point used in reducing the complexity evaluated in the evaluating.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 10 is an explanatory diagram for explaining Impact Scale;

FIGS. 11A and 11B are explanatory diagrams for explaining the characteristics of the Impact Scale;

FIG. 15 is a schematic diagram of an example of refactoring sequence information;

DESCRIPTION OF EMBODIMENT(S)

Preferred embodiments of the present invention will be explained with reference to accompanying drawings. The present invention is not limited to that embodiment.

Figure 1:
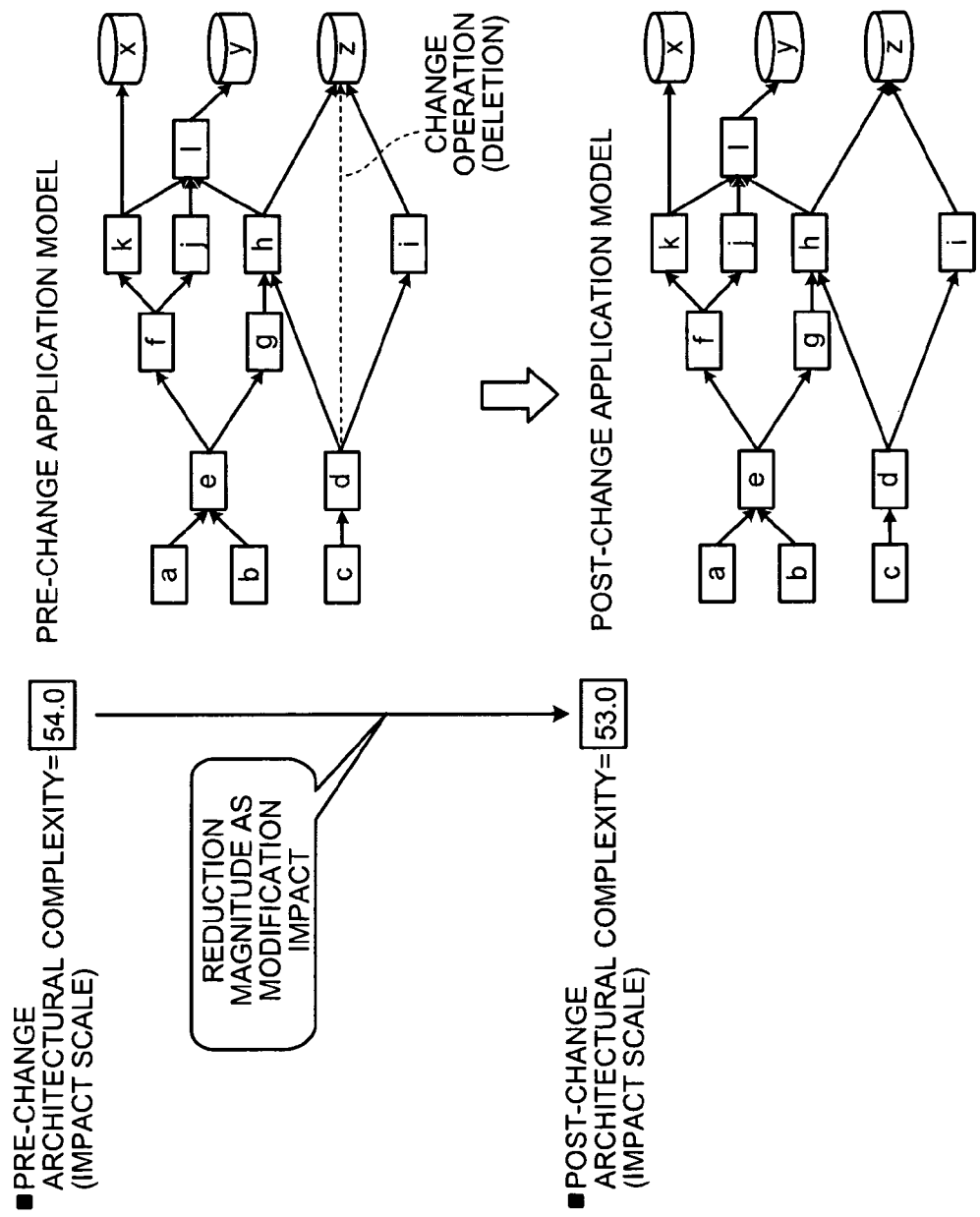
FIG. 1 is an explanatory diagram for explaining the concept of application enhancement according to a present embodiment.

Firstly, the description is given about the concept of application enhancement according to the present embodiment. FIG. 1 is an explanatory diagram for explaining the concept of application enhancement according to the present embodiment. In FIG. 1 are illustrated application models and architectural complexities of an application before and after a change is made therein.

An application model is abstraction and representation of an application in the form of a graph data structure. An application includes "modules" that are smaller processing units and "data" that is used by the application in a persistent manner. A module is set to have a suitable granularity depending on the scale of the corresponding application or the description language. Typically, in COBOL, a single program serves as a module; while in Java (registered trademark), a single class serves as a module. However, it is also possible to treat as a module a package or the like that is a larger processing unit.

The "data" of an application represents a set of information having a life longer than temporary life for that application. The data can be files, databases, permanent objects, or input-output devices. The modules and the data correspond to nodes of the graph structure of an application model. In FIG. 1, "a" to "l" represent modules; while "x" to "z" represent data.

Based on the control flow relations between the modules constituting an application, the dependency relations between the modules and the data of the application, and the dependency relations between the data, an application model represents the relations of connection between the modules, between the modules and the data, and between the data. The links that connect the nodes, which indicate the modules or the data, represent the control flow relations between the modules, the dependency relations between the modules and the data, or the dependency relations between the data. The links are often times directed links, but can sometimes be undirected links.

In the application enhancement illustrated in FIG. 1, the dependency relation between the module d and the data z is deleted such that the architectural complexity of the application is reduced from 54.0 to 53.0.

Herein, the architectural complexity represents the strength of relationship between the modules or the data over a wide scope of an application or represents the extent of impact attributed to changes made to particular modules or data based on the control flow relations or the data dependency relations. A higher architectural complexity leads to an increase in the workload in performing function additions or in performing changes in the corresponding application. The result of that is a rise in the degree of difficulty. Thus, in a manner, the architectural complexity contributes to the difficulty encountered in application maintenance. Meanwhile, the architectural complexity can be defined with respect to an arbitrary portion (including the entire portion) of an application.

In this way, to achieve application enhancement in the present embodiment, the architectural complexity is reduced by manipulating the relations of connection in the application model. It can be said that the higher the degree of reduction in the architectural complexity, the greater is the enhancement impact. Meanwhile, in the present embodiment, the Impact Scale is used as the architectural complexity. The details of the Impact Scale are described later.

Figure 2:
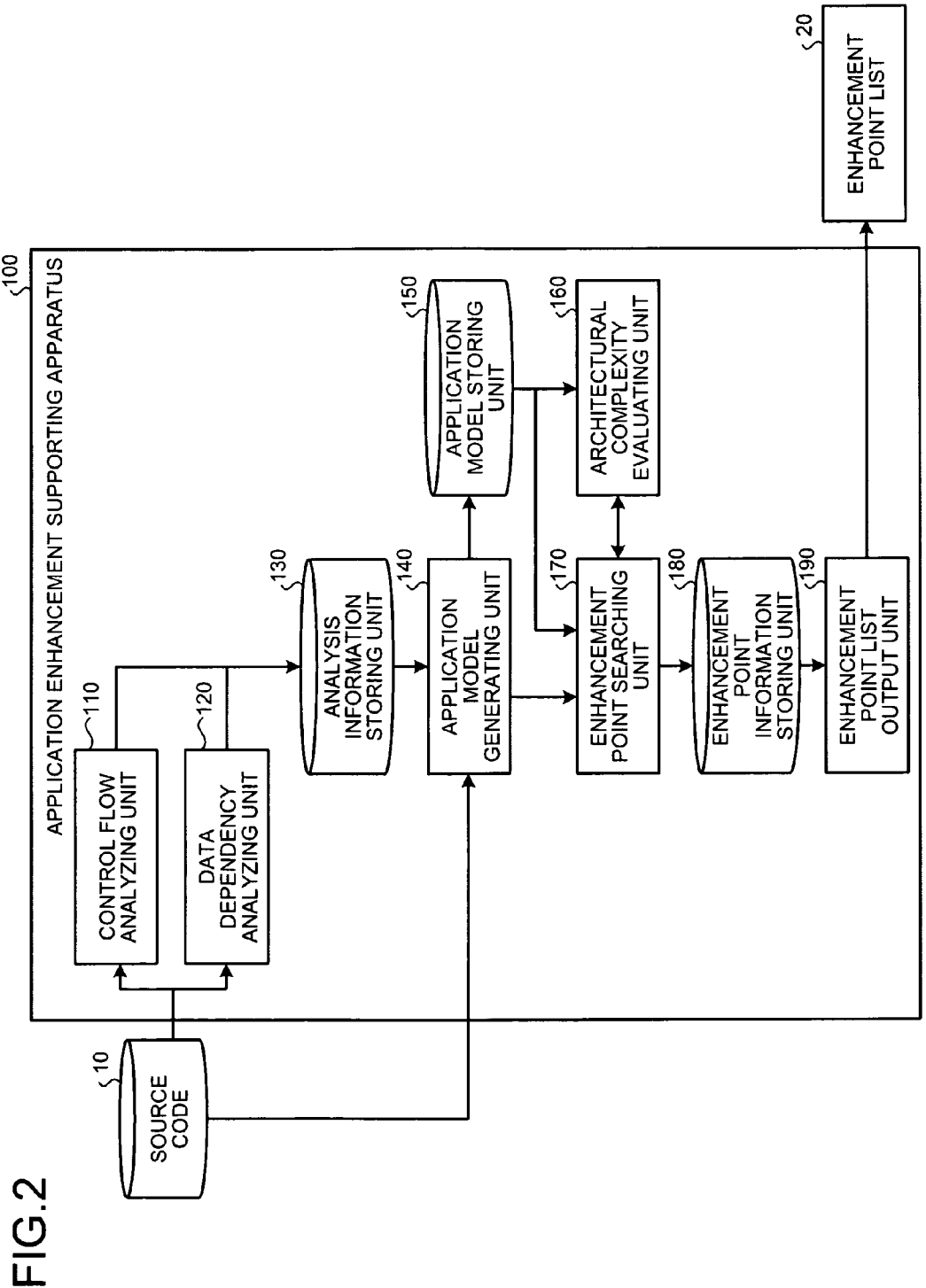
FIG. 2 is a functional block diagram of a configuration of an application enhancement supporting apparatus according to the present embodiment.

Given below is the description of a configuration of an application enhancement supporting apparatus according to the present embodiment. FIG. 2 is a functional block diagram of a configuration of the application enhancement supporting apparatus according to the present embodiment. As illustrated in FIG. 2, an application enhancement supporting apparatus 100 includes a control flow analyzing unit 110, a data dependency analyzing unit 120, an analysis information storing unit 130, an application model generating unit 140, an application model storing unit 150, an architectural complexity evaluating unit 160, an enhancement point searching unit 170, an enhancement point information storing unit 180, and an enhancement point list output unit 190.

The control flow analyzing unit 110 is a processing unit that performs control flow analysis on a source code 10 of an application including a plurality of modules and that stores the analysis result in the analysis information storing unit 130. The data dependency analyzing unit 120 is a processing unit that performs data dependency analysis on the source code 10 and stores the analysis result in the analysis information storing unit 130. Meanwhile, Alfred V. Aho, Ravi Sethi, Jeffrey D. Ullman, "Compilers: Principles, Techniques, and Tools," Addison-Wesley, 1986 explains control flow analysis and data dependency analysis.

The analysis information storing unit 130 is a memory unit used to store the analysis result regarding the source code 10 obtained by the control flow analyzing unit 110 and the data dependency analyzing unit 120. More particularly, the analysis information storing unit 130 stores module analysis information that represents the analysis result regarding the modules; data analysis information that represents the analysis result regarding the data; and relation analysis information that represents the analysis result on the relations between the modules, between the modules and the data, and between the data.

As an inter-modular relation, for example, consider a case when a module A calls a method of a module B. In that case, a module calling relation from the module A to the module B exists. Another example of an inter-modular relation is an inheritance relation between classes. As a relation between a module and data, for example, consider a case when the module A creates data F. In that case, a data access (creation) relation from the module A to the data F exists.

Figure 3:
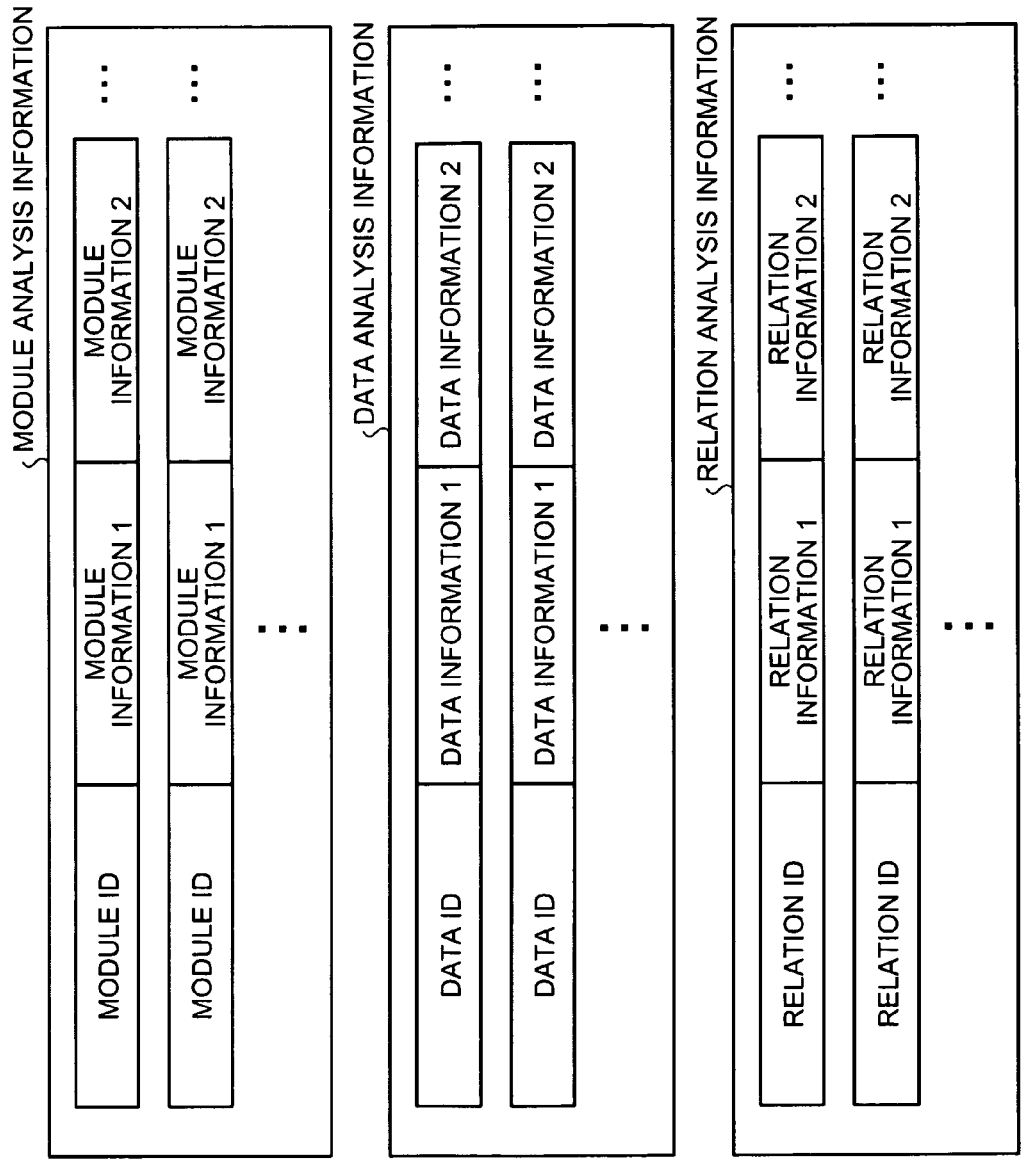
FIG. 3 is a schematic diagram of module analysis information, data analysis information, and relation analysis information stored in an analysis information storing unit.

FIG. 3 is a schematic diagram of the module analysis information, the data analysis information, and the relation analysis information stored in the analysis information storing unit 130. As illustrated in FIG. 3, the module analysis information includes module IDs used in module identification and a variety of corresponding module information. The module information includes module name, date of creation, module size, and the like. The data analysis information includes data IDs identifying data and a variety of corresponding data information. The data information includes data name, date of creation, data size, and the like. The relation analysis information includes relation IDs identifying relation and a variety of corresponding relation information. The relation information includes relation source ID indicating relation source, relation destination ID indicating relation destination, relation type indicating the type of relation, and the like.

Figure 4:
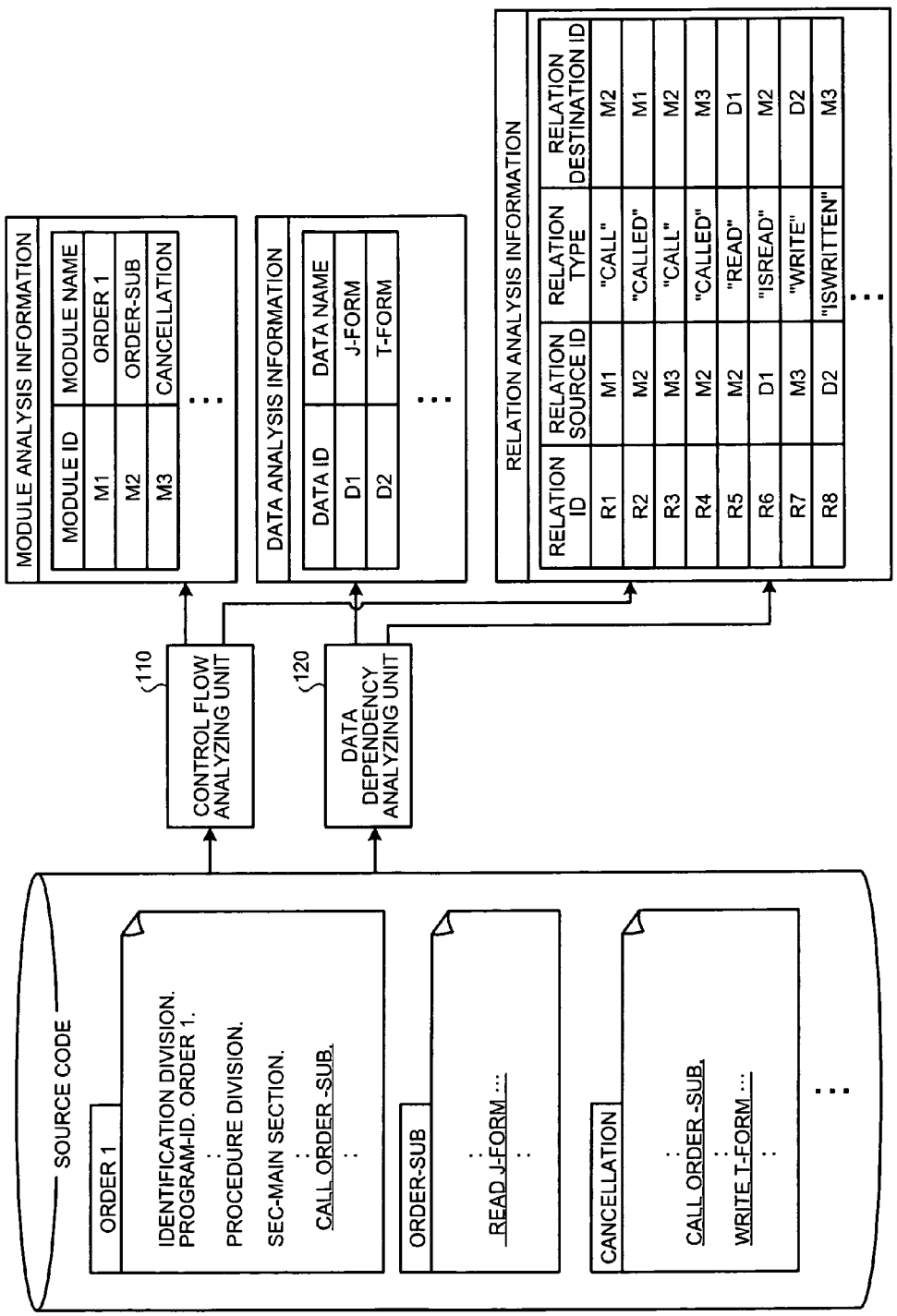
FIG. 4 is a schematic diagram of an example of the module analysis information, the data analysis information, and the relation analysis information that is retrieved from a source code by performing control flow analysis and data dependency analysis.

FIG. 4 is a schematic diagram of an example of the module analysis information, the data analysis information, and the relation analysis information that is retrieved from the source code 10 by performing control flow analysis and data dependency analysis. In this example, module names are illustrated to be retrieved as the module information; data names are illustrated to be retrieved as the data information; and relation source IDs, relation types, and relation destination IDs are illustrated to be retrieved as the relation information.

The application model generating unit 140 is a processing unit that generates an application model by referring to the information stored in the analysis information storing unit 130 and to the source code 10, and stores the application model in the application model storing unit 150.

Figure 5:
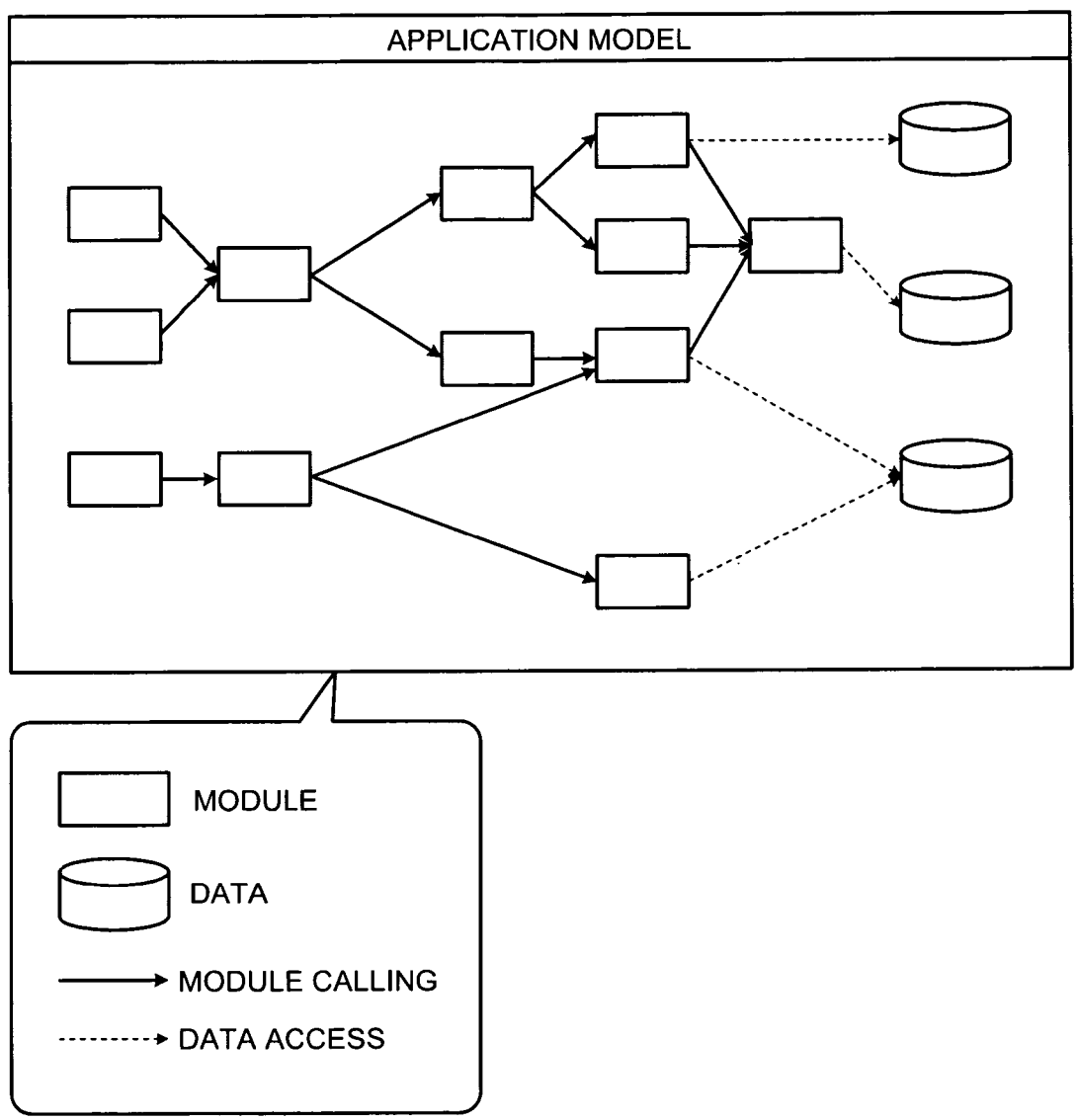
FIG. 5 is a schematic diagram of an application model stored in an application model storing unit.

The application model storing unit 150 is a memory unit that stores therein application models. FIG. 5 is a schematic diagram of an application model stored in the application model storing unit 150. As illustrated in FIG. 5, the application model is generated based on three types of relations, namely, module calling relations, called module relations, and data access relations. Meanwhile, the application model includes 12 modules and 3 data. The solid arrows illustrated therein indicate the module calling relations (the solid arrows also indicate the called module relations), while the dashed arrows indicate the data access relations from the modules.

In addition, the application model is closely related to the definition of application complexity. Since the application model is used as the object for measuring the application complexity, the application model needs to provide all necessary information required in measuring the application complexity. The details of the required information depend on the definition of application complexity to be employed. In the present embodiment, the Impact Scale described later is used as the application complexity and, for the Impact Scale, information on the three types of relations; namely, module calling relations, called module relations, and data access relations is required. For that reason, in the present embodiment, the application model based on the three types of relations, namely, module calling relations, called module relations, and data access relations is used.

Figure 6:
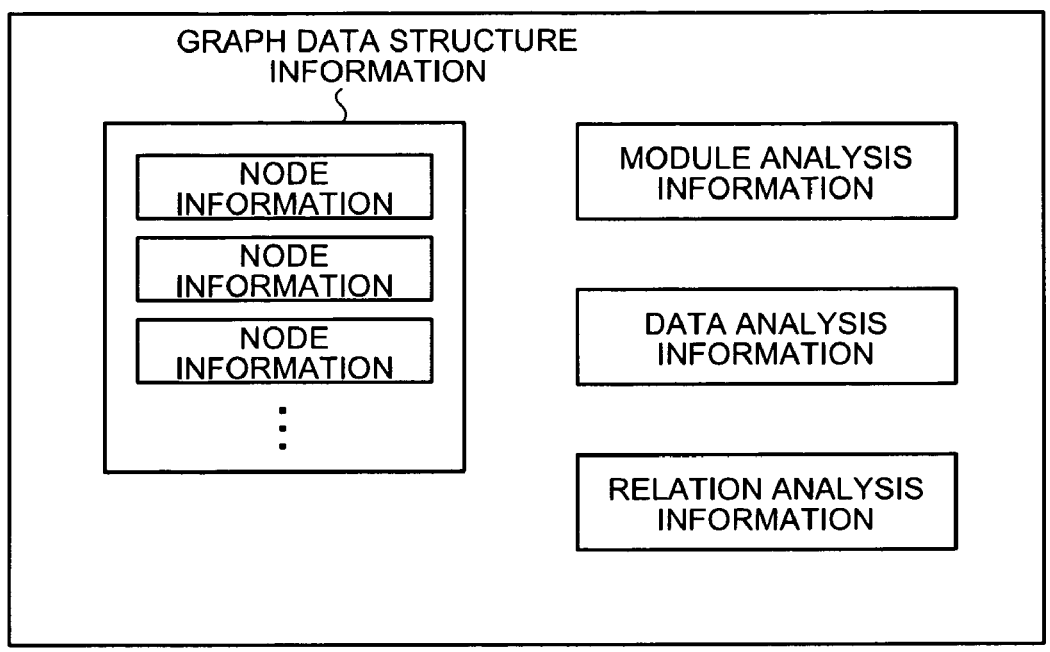
FIG. 6 is a schematic diagram of a data structure of the application model.

FIG. 6 is a schematic diagram of a data structure of the application model. As illustrated in FIG. 6, the application model includes module analysis information, data analysis information, relation analysis information, and graph data structure information. The graph data structure information includes node information in plurality.

Figure 7:
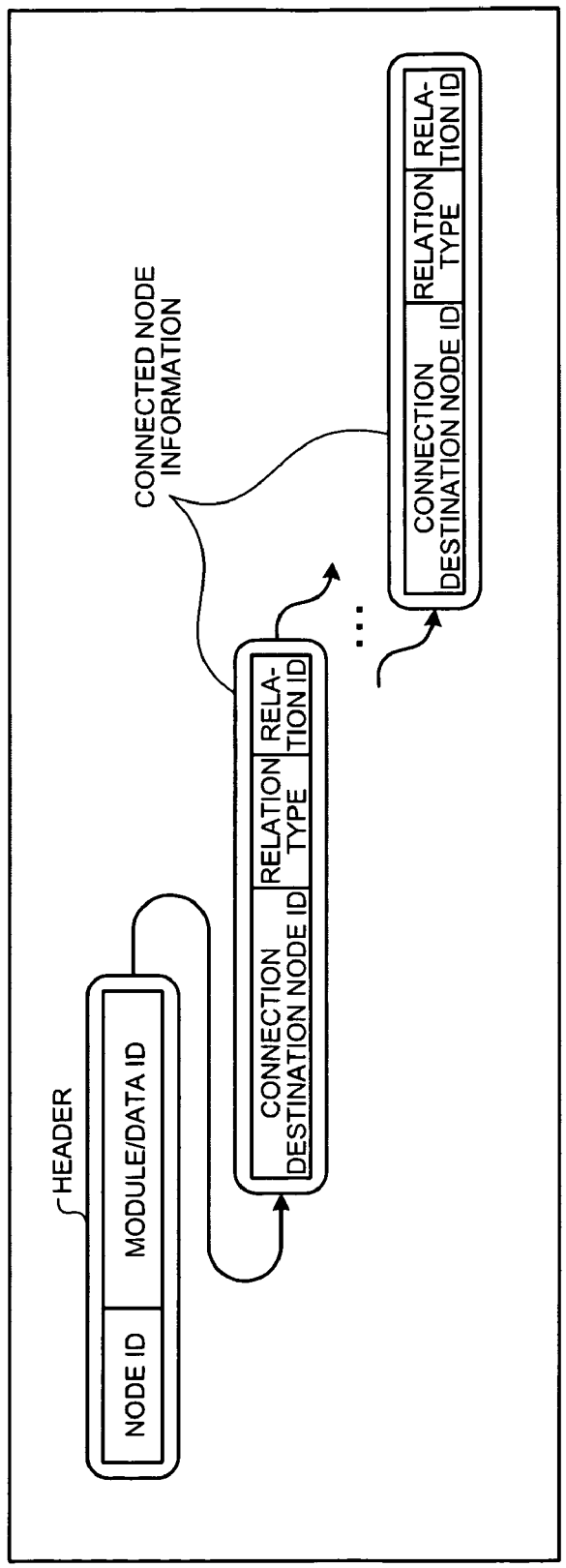
FIG. 7 is a schematic diagram of a data structure of node information.

FIG. 7 is a schematic diagram of a data structure of the node information. As illustrated in FIG. 7, the node information includes a header, which includes a node ID identifying a node, and an ID of a module or data that the corresponding node represents, and connected-node information. Each of the connected-node information includes a connection destination node ID, a relation type, and a relation ID. Moreover, the connected-node information is connected to other connected node information of the number of the connected nodes, that is, of the number of relations, by a linked list.

Figure 8:
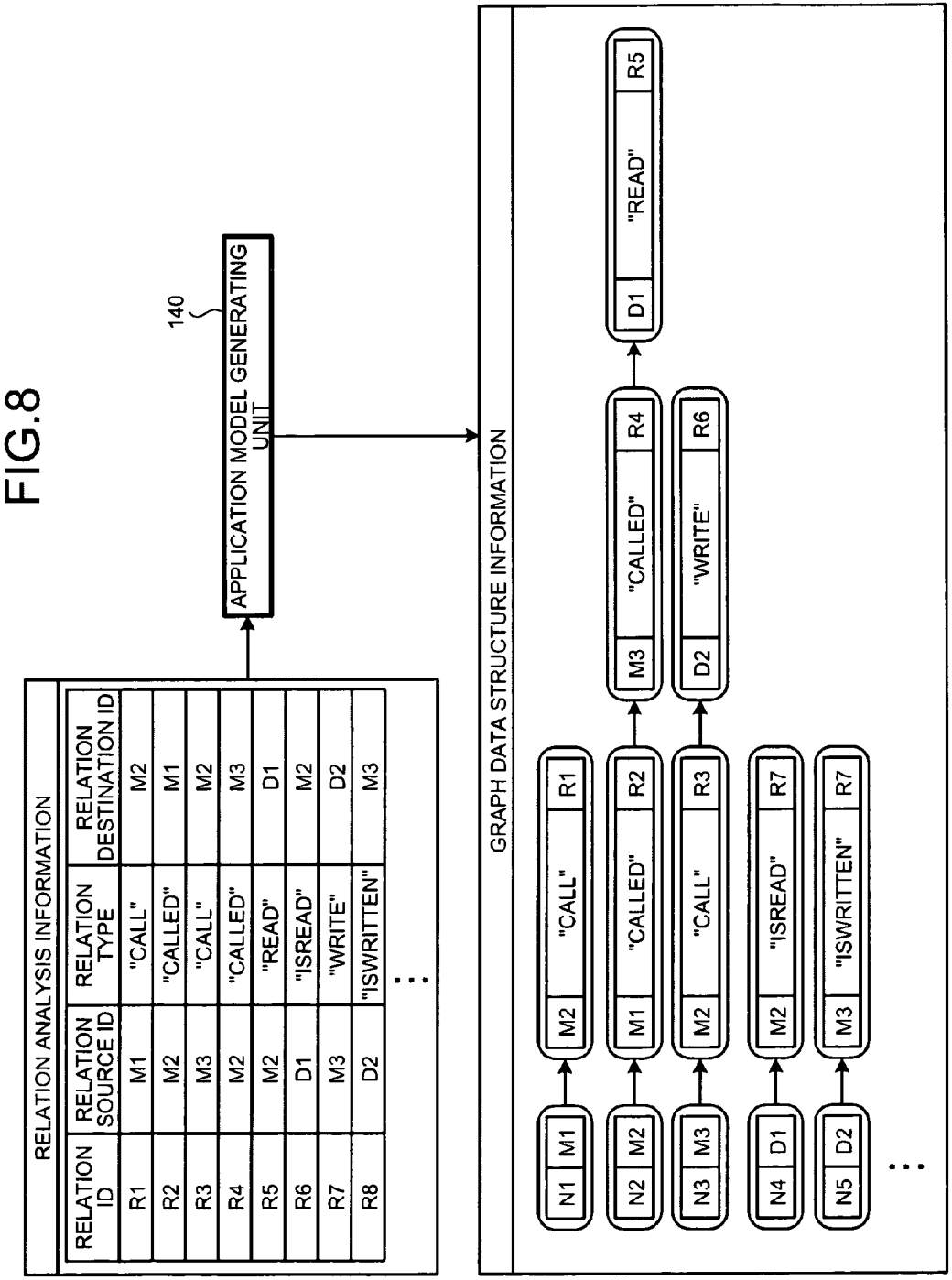
FIG. 8 is a schematic diagram of an example of graph data structure information generated by an application model generating unit with the use of relation analysis information.

FIG. 8 is a schematic diagram of an example of the graph data structure information generated by the application model generating unit 140 based on the relation analysis information. In FIG. 8, for example, to a module M1 is connected by a linked list a relation R1 indicating a call to a module M2 and to the module M2 are connected by a linked list a relation R2 indicating being called by the module M1, a relation R4 indicating being called by a module M3, and a relation R5 indicating reading of data D1.

Figure 9:
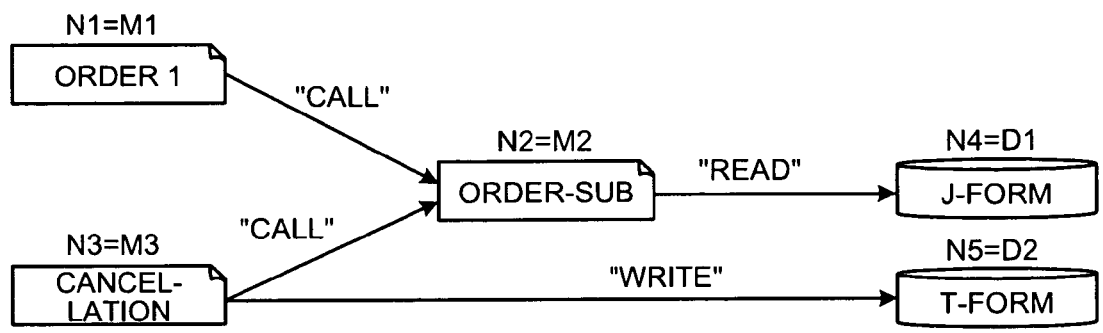
FIG. 9 is a schematic diagram of a graphic representation of the application model corresponding to the graph data structure information illustrated in FIG. 8.

FIG. 9 is a schematic diagram of a graphic representation of the application model corresponding to the graph data structure illustrated in FIG. 8. In FIG. 9, for example, the relation R1 indicating that the module M1 having module name "ORDER1" calls the module M2 having module name "ORDER-SUB" and the relation R2 indicating that the module M2 having module name "ORDER-SUB" is called by the module M1 having module name "ORDER1" are represented by an arrow from "ORDER1" to "ORDER-SUB".

The architectural complexity evaluating unit 160 is a processing unit that refers to the application model and calculates the architectural complexity of the application. The architectural complexity evaluating unit 160 uses the Impact Scale as the architectural complexity. Herein, the Impact Scale is a metrics for evaluating the application from the architectural perspective and is defined as illustrated in FIG. 10, in which an application is represented as a graph.

That is, with respect to each module constituting the application, the Impact Scale IS is defined as:

$$IS = S(1) + \alpha S(2) + \alpha^2 S(3) + \ldots$$

where, $S(d)$ is the number of modules and data having the shortest distance d when the application is represented as a graph based on the inter-modular calling relations and the access relations between the modules and the data, and $\alpha$ is an attenuation coefficient ($0 < \alpha < 1$). The Impact Scale of the entire application is the sum of the Impact Scale of all modules.

As illustrated in FIG. 11A, the Impact Scale is characterized by the fact that it grows larger when the coupling of the modules and the data is complex. Further, as illustrated in FIG. 11B, the Impact Scale is characterized by the fact that it increases when the application loses modularity. FIG. 11B illustrates that Impact Scale increases when modularity is lost due to changes.

Figure 12:
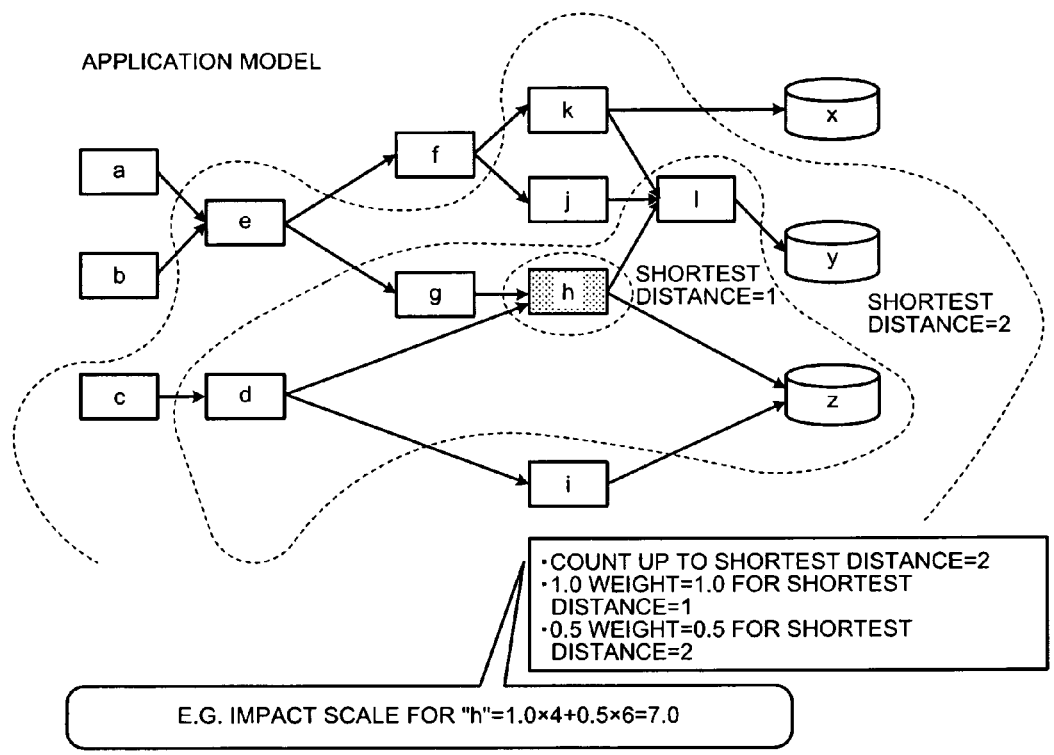
FIG. 12 is a schematic diagram of a calculation example of the Impact Scale.

FIG. 12 is a schematic diagram of a calculation example of the Impact Scale. The example in FIG. 12 is given for a case when the modules and the data are counted up to the shortest distance d=2. Moreover, $\alpha$ is assumed to be equal to 0.5. As illustrated in FIG. 12, for example, with respect to the module h; the number of modules and data having the shortest distance d=1 is four and the number of modules and data having the shortest distance d=2 is six. Thus, the Impact Scale for the module h is calculated as: 1.0×4+0.5×6=7.0. The Impact Scale for all other modules is also calculated in an identical manner. Thus, as the sum, the Impact Scale of the entire application model is equal to 53.0. That is the value of architectural complexity after making the change illustrated in FIG. 1.

In this way, since the architectural complexity evaluating unit 160 uses the Impact Scale as the architectural complexity, it becomes possible to evaluate the complexity of the application from the architectural perspective.

The enhancement point searching unit 170 is a processing unit that refers to the architectural complexity and the application model, searches the application model for probable points for enhancement in the application, and stores the found points for enhancement in the enhancement point information storing unit 180 together with a degree of enhancement. That is, the enhancement point searching unit 170 searches the application model for the portions with respect to which refactoring is effective at the architecture level.

Figure 13:
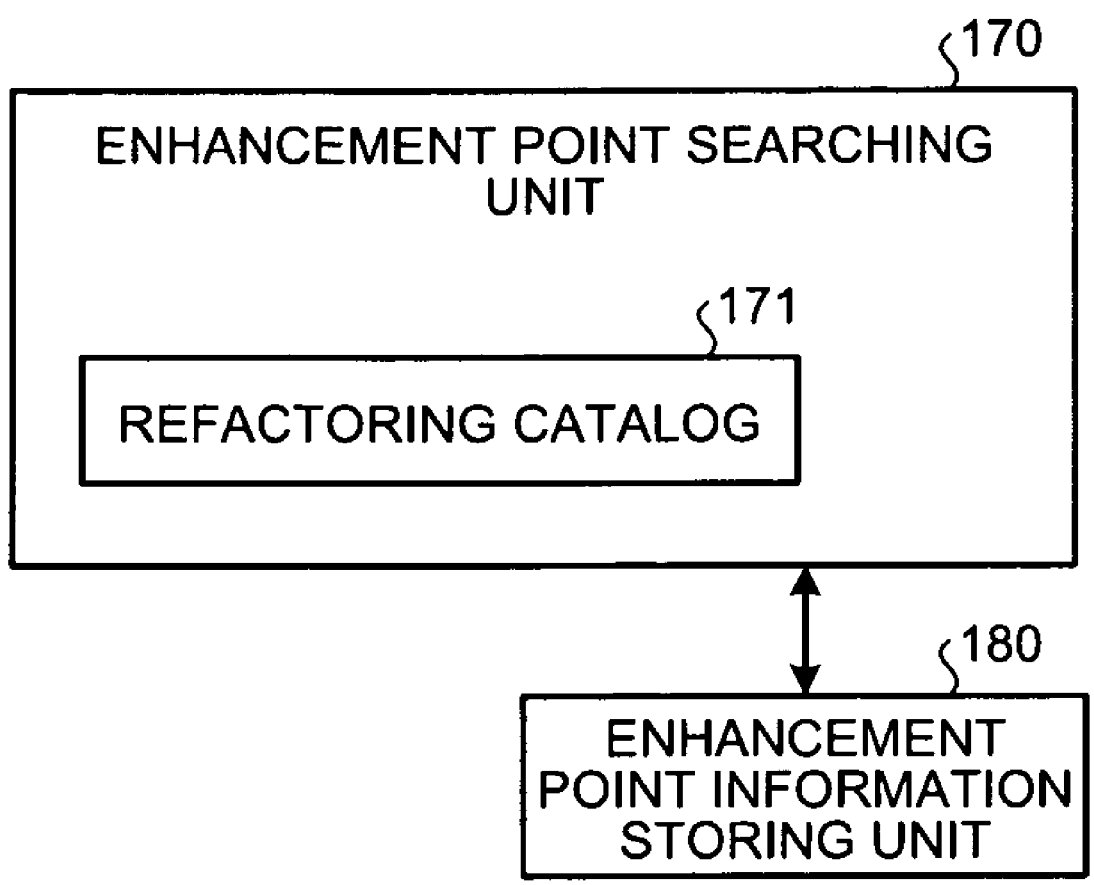
FIG. 13 is a schematic diagram of a configuration of an enhancement point searching unit.
Figure 14:
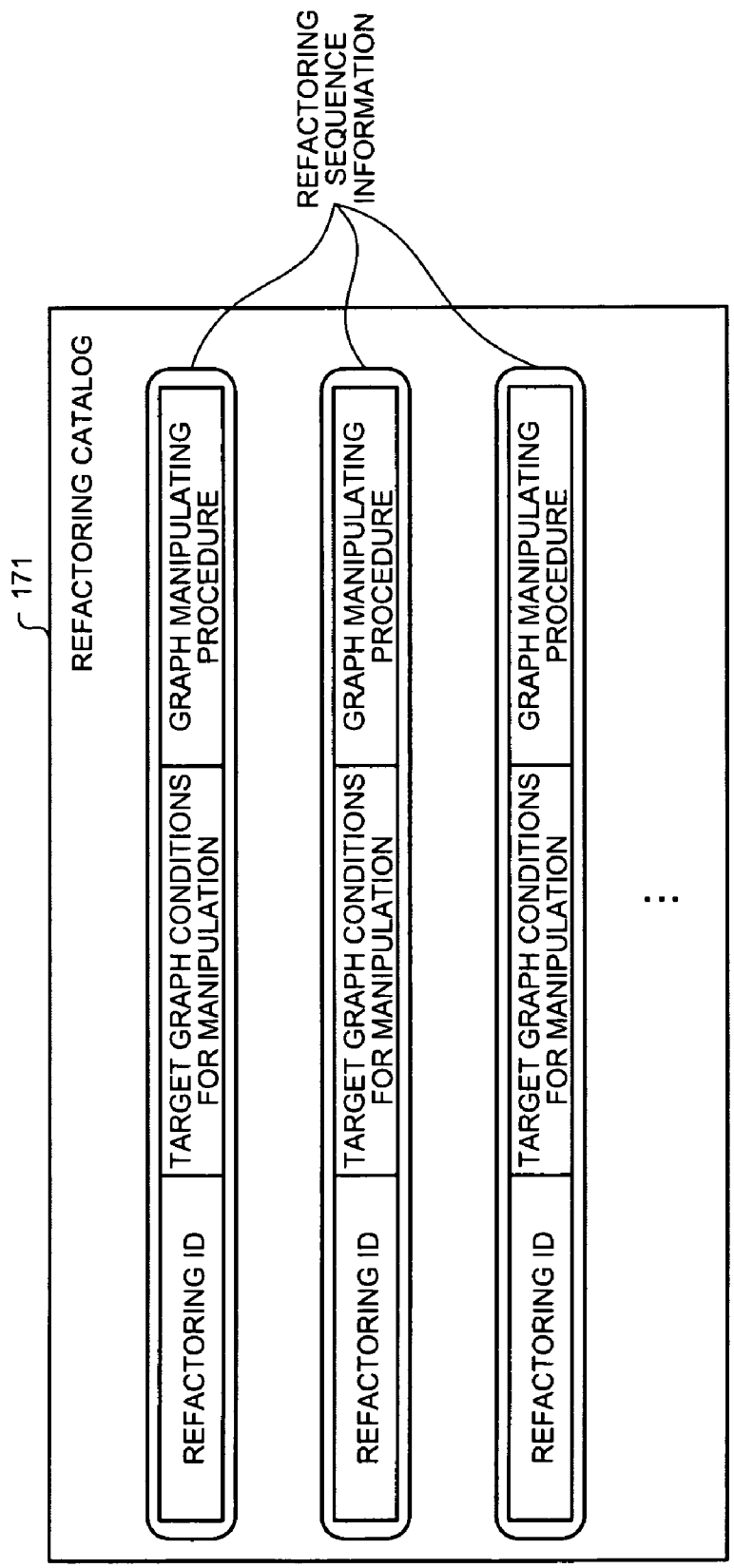
FIG. 14 is a schematic diagram of data structure of an exemplary refactoring catalog.

FIG. 13 is a schematic diagram of a configuration of the enhancement point searching unit 170. As illustrated in FIG. 13, the enhancement point searching unit 170 includes a refactoring catalog 171, which is a set of refactoring sequence information as illustrated in FIG. 14. Each of the refactoring sequence information includes a refactoring ID identifying a refactoring sequence, target graph conditions for manipulation, and a graph manipulating procedure.

The target graph conditions for manipulation are conditions for determining, with respect to a particular node or link, whether a graph manipulating procedure can be executed. A graph manipulating procedure is an entry to a function that actually performs graph manipulation.

FIG. 15 is a schematic diagram of an example of the refactoring sequence information. As illustrated in FIG. 15, for example, for a particular link as the graph manipulation target and under the condition that the nodes on both ends of that particular link are connected by a different path not including that particular link; refactoring can be done by performing graph manipulation of cutting that particular link. The example of the change made in the application model illustrated in FIG. 1 is based on this graph manipulation procedure.

Figure 16A:
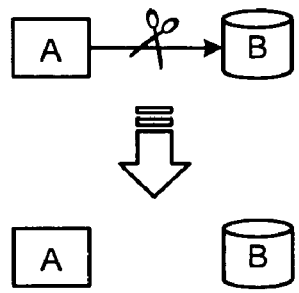
FIGS. 16A to 16D are schematic diagrams of examples of graph manipulation.
Figure 16B:
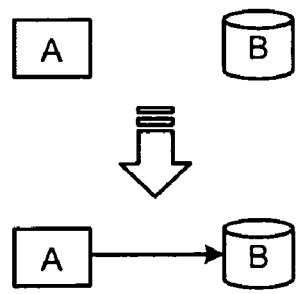
Figure 16C:
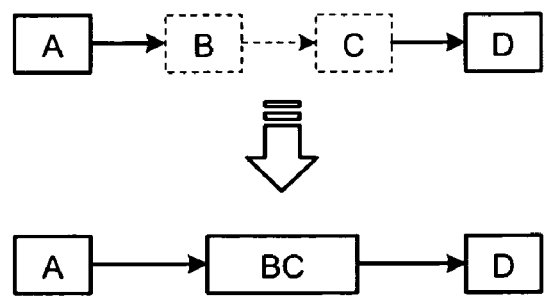
Figure 16D:
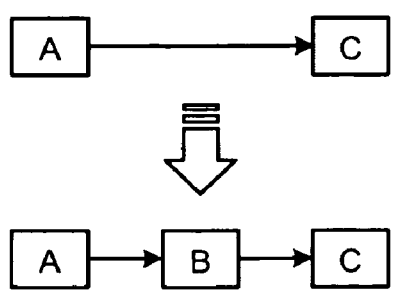

FIGS. 16A to 16D are schematic diagrams of examples of graph manipulation. FIG. 16A represents graph manipulation of deleting (i.e., cutting) a link, FIG. 16B represents graph manipulation of connecting two nodes with a new link, FIG. 16C represents graph manipulation of merging two nodes into one node, and FIG. 16D represents graph manipulation of replacing a link between two nodes by links with respect to a new node. Meanwhile, the graph manipulations illustrated in FIGS. 16A to 16D can be considered to be primitive manipulations, and it is possible to perform complex manipulations such as standardization of sub-graphs with resembling topology using the combination of primitive manipulations.

In this way, since the enhancement point searching unit 170 makes use of the refactoring catalog 171 in searching the application model for enhancement points, support can be provided for refactoring at the architecture level.

Figure 17:
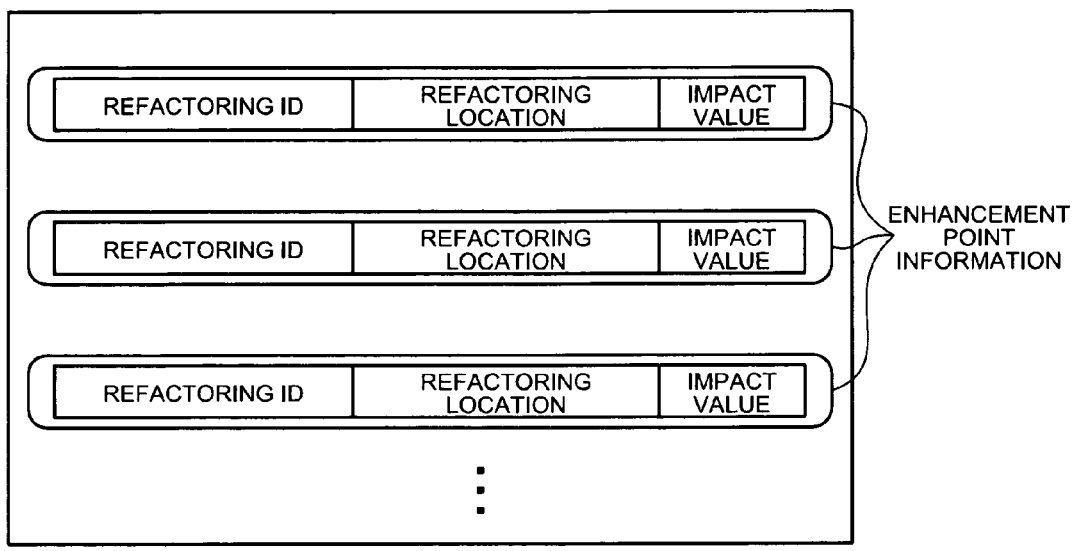
FIG. 17 is a schematic diagram of enhancement point information.
Figure 18:
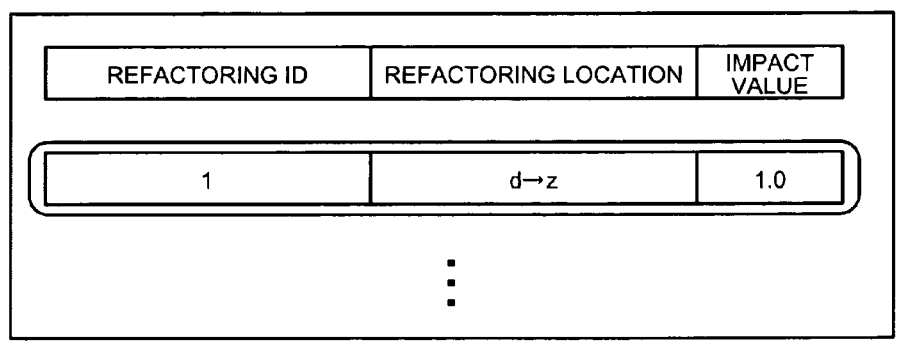
FIG. 18 is a schematic diagram of a specific example of the enhancement point information.

The enhancement point information storing unit 180 is a memory unit used to store enhancement point information for each enhancement point. FIG. 17 is a schematic diagram of the enhancement point information. As illustrated in FIG. 17, each of the enhancement point information includes a refactoring ID, corresponding refactoring location in the application model, and an impact value that indicates the degree of enhancement produced by refactoring. FIG. 18 is a schematic diagram of a specific example of the enhancement point information. This example illustrates the enhancement point information corresponding to the application enhancement illustrated in FIG. 1. That is, this example illustrates the enhancement point information of deleting the link between the node d and the node z in FIG. 1.

The enhancement point list output unit 190 is a processing unit that outputs an enhancement point list 20. While outputting the enhancement point list 20, the enhancement point list output unit 190 assumes that the a changed location with a greater refactoring impact has a higher priority and outputs the enhancement points in the descending order of the degrees of refactoring impact. Since the enhancement point list output unit 190 outputs the enhancement points in the descending order of the degrees of refactoring impact, it becomes possible to allocate the limited operation time to that refactoring task which produces a greater impact.

Figure 19:
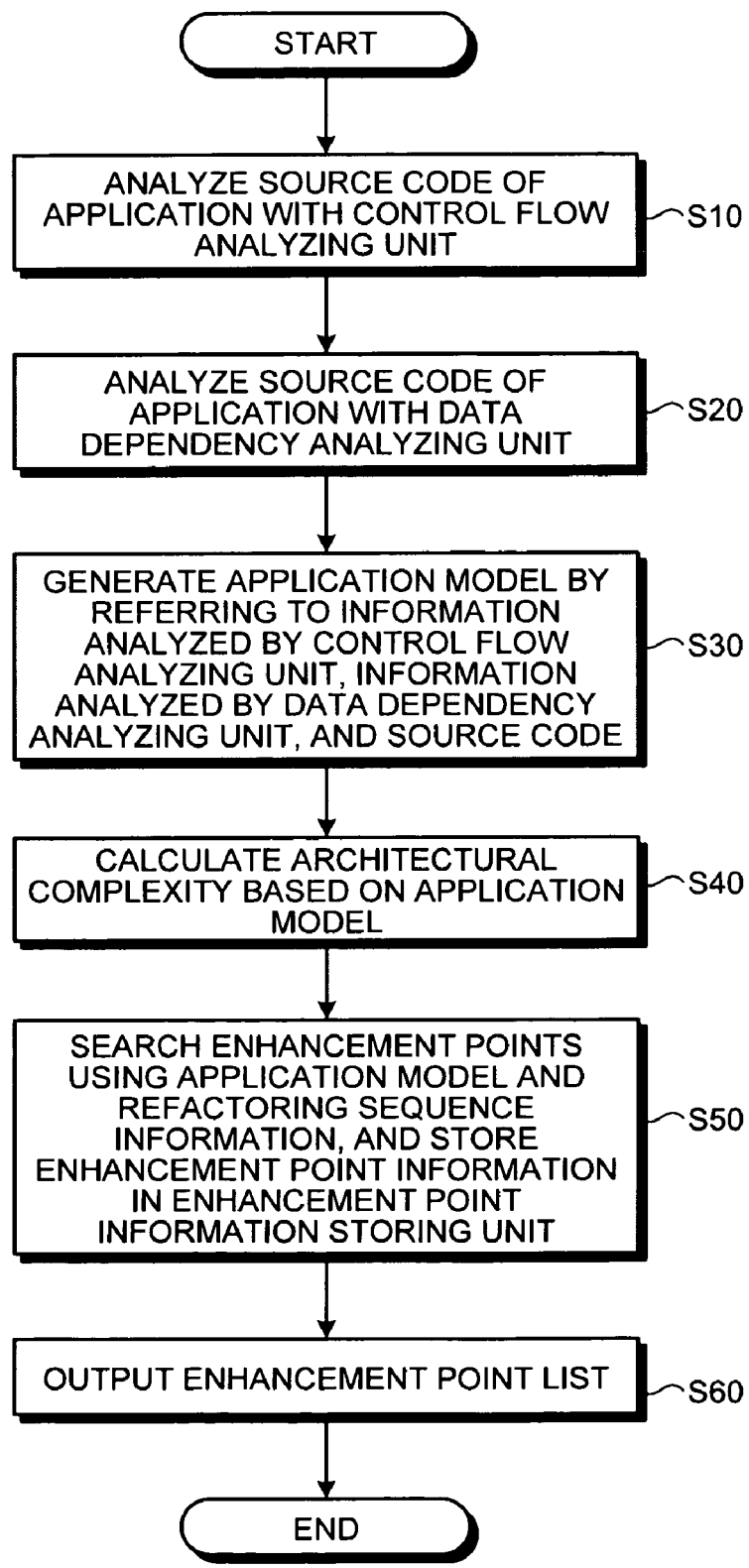
FIG. 19 is a flowchart for explaining a sequence of operations performed by the application enhancement supporting apparatus according to the present embodiment.

Given below is the description of a sequence of operations performed by the application enhancement supporting apparatus 100 according to the present embodiment. FIG. 19 is a flowchart for explaining a sequence of operations performed by the application enhancement supporting apparatus 100 according to the present embodiment. As illustrated in FIG. 19, in the application enhancement supporting apparatus 100, the control flow analyzing unit 110 and the data dependency analyzing unit 120 analyze the source code 10 of the application (Steps S10 to S20).

Then, the application model generating unit 140 refers to the information analyzed by the control flow analyzing unit 110, the information analyzed by the data dependency analyzing unit 120, and the source code 10, and generates an application model (Step S30). The architectural complexity evaluating unit 160 then calculates the architectural complexity of the application model (Step S40).

Subsequently, the enhancement point searching unit 170 searches, with the use of the refactoring sequence information, the application model for enhancement points that enable reduction in the architectural complexity and stores the enhancement point information in the enhancement point information storing unit 180 (Step S50). The enhancement point list output unit 190 then reads the enhancement point information from the enhancement point information storing unit 180 and outputs the enhancement point list 20 (Step S60).

In this way, refactoring of the application can be supported by searching the application model for enhancement points that enable reduction in the architectural complexity and outputting those enhancement points.

Figure 20:
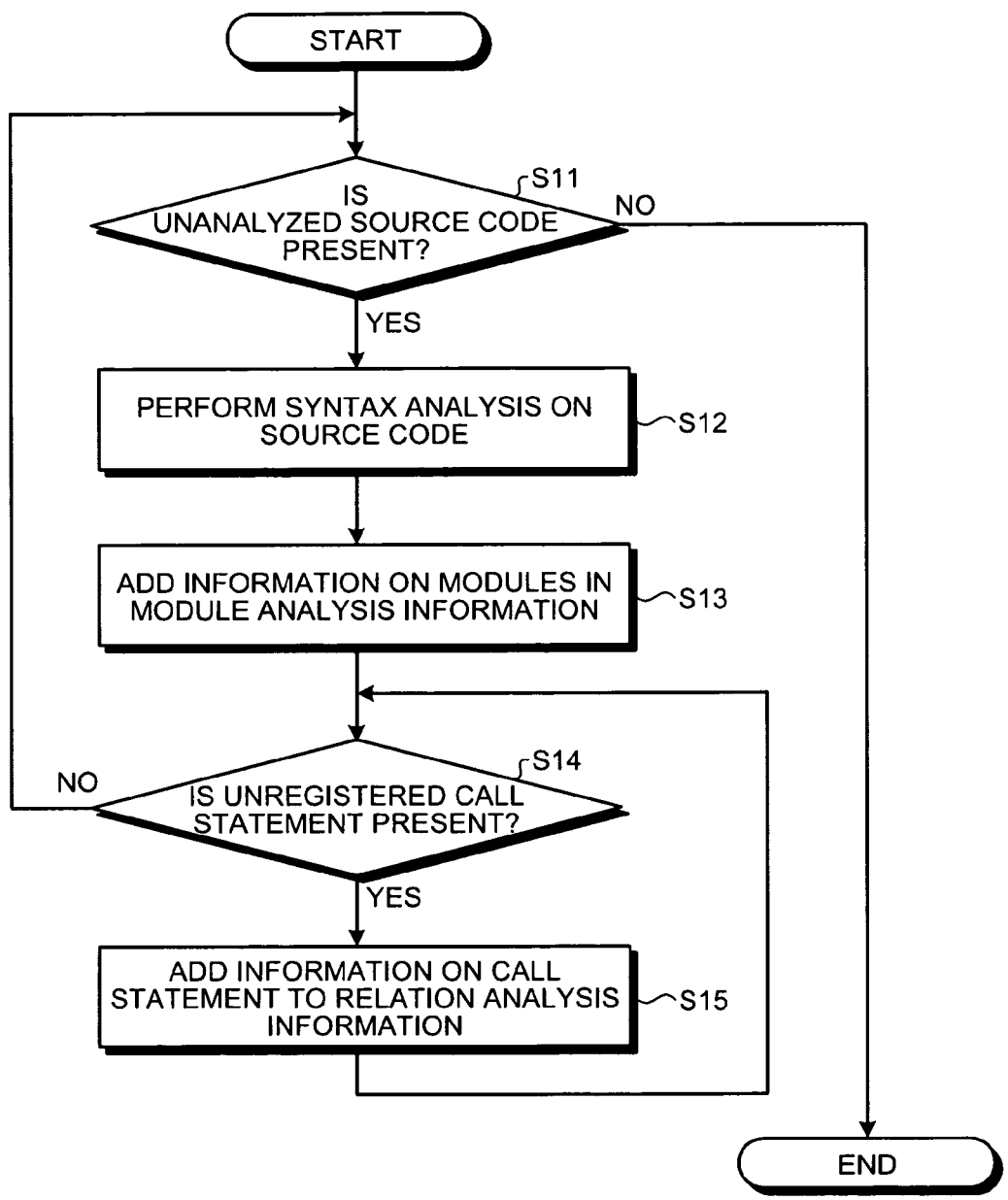
FIG. 20 is a flowchart for explaining a sequence of operations performed by a control flow analyzing unit.

Given below is a sequence of operations performed by the control flow analyzing unit 110. FIG. 20 is a flowchart for explaining a sequence of operations performed by the control flow analyzing unit 110. As illustrated in FIG. 20, the control flow analyzing unit 110 first determines whether unanalyzed source code 10 is present (Step S11) and, if no unanalyzed source code 10 is present, exits the processing because of the fact that the analysis is completed.

On the other hand, if unanalyzed source code 10 is present, then the control flow analyzing unit 110 performs syntax analysis on the unanalyzed source code 10 (Step S12) and adds the information on modules in the module analysis information (Step S13). Then, the control flow analyzing unit 110 determines whether an unregistered call statement is present (Step S14) and, during the period in which an unregistered call statement is present, adds the information on that call statement to the relation analysis information (Step S15). When no unregistered call statement is present, the control flow analyzing unit 110 returns to Step S11 for the analysis of different source code 10.

In this way, since the control flow analyzing unit 110 adds the information on call statements to the relation analysis information, the inter-modular calling relations can be included in the application model.

Figure 21:
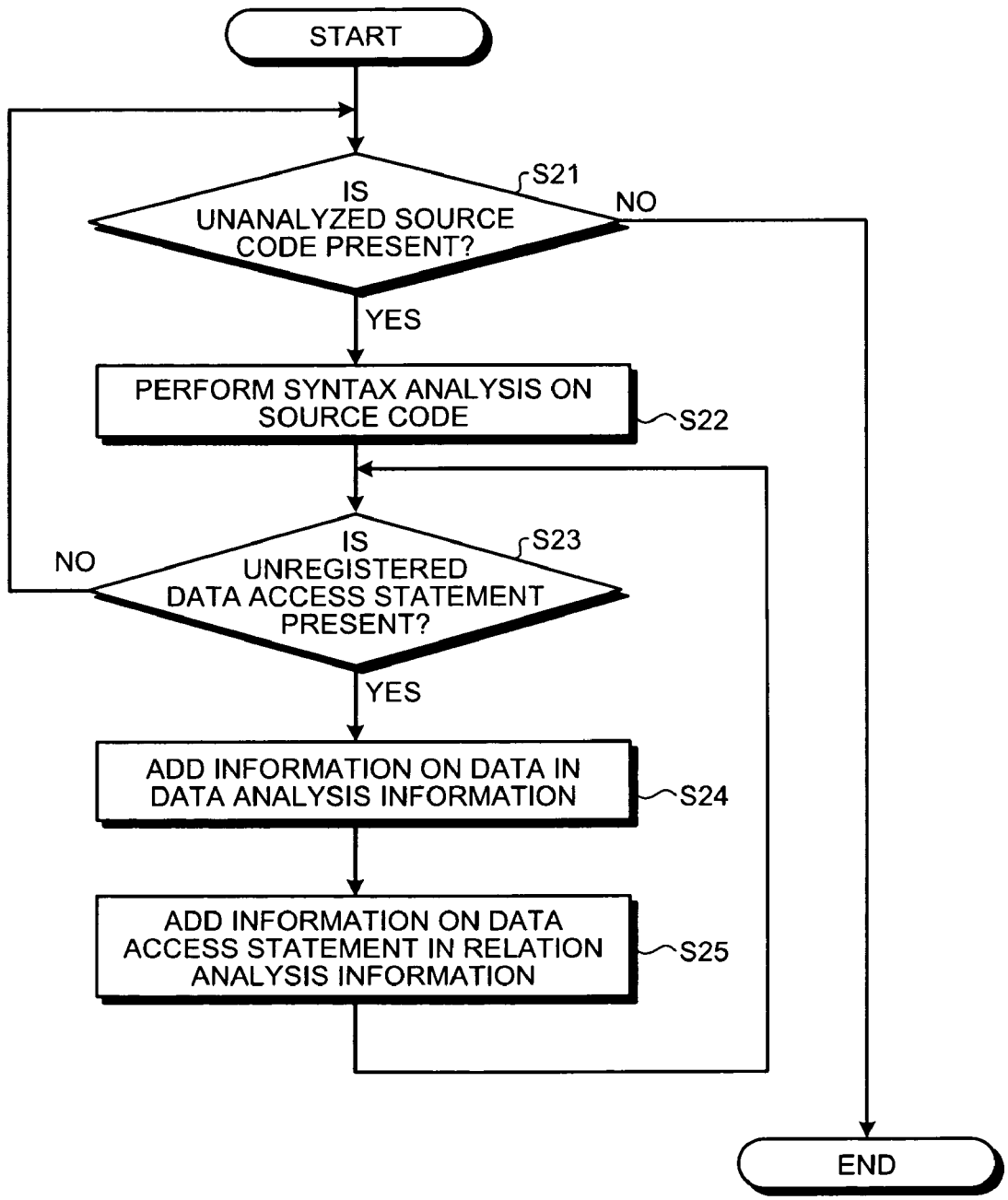
FIG. 21 is a flowchart for explaining a sequence of operations performed by a data dependency analyzing unit.

Given below is a sequence of operations performed by the data dependency analyzing unit 120. FIG. 21 is a flowchart for explaining a sequence of operations performed by the data dependency analyzing unit 120. As illustrated in FIG. 21, the data dependency analyzing unit 120 first determines whether unanalyzed source code 10 is present (Step S21) and, if no unanalyzed source code 10 is present, exits the processing because of the fact that the analysis is completed.

On the other hand, if unanalyzed source code 10 is present, then the data dependency analyzing unit 120 performs syntax analysis on the unanalyzed source code 10 (Step S22) and determines whether an unregistered data access statement is present (Step S23). During the period in which an unregistered data access statement is present, the data dependency analyzing unit 120 adds the information on data in the data analysis information (Step S24) and adds the information on that data access statement in the relation analysis information (Step S25). When no unregistered data access statement is present, the data dependency analyzing unit 120 returns to Step S21 for the analysis of different source code 10.

In this way, since the data dependency analyzing unit 120 adds the information on data access statements to the relation analysis information, the inter-module/data access relations can be included in the application model.

Figure 22:
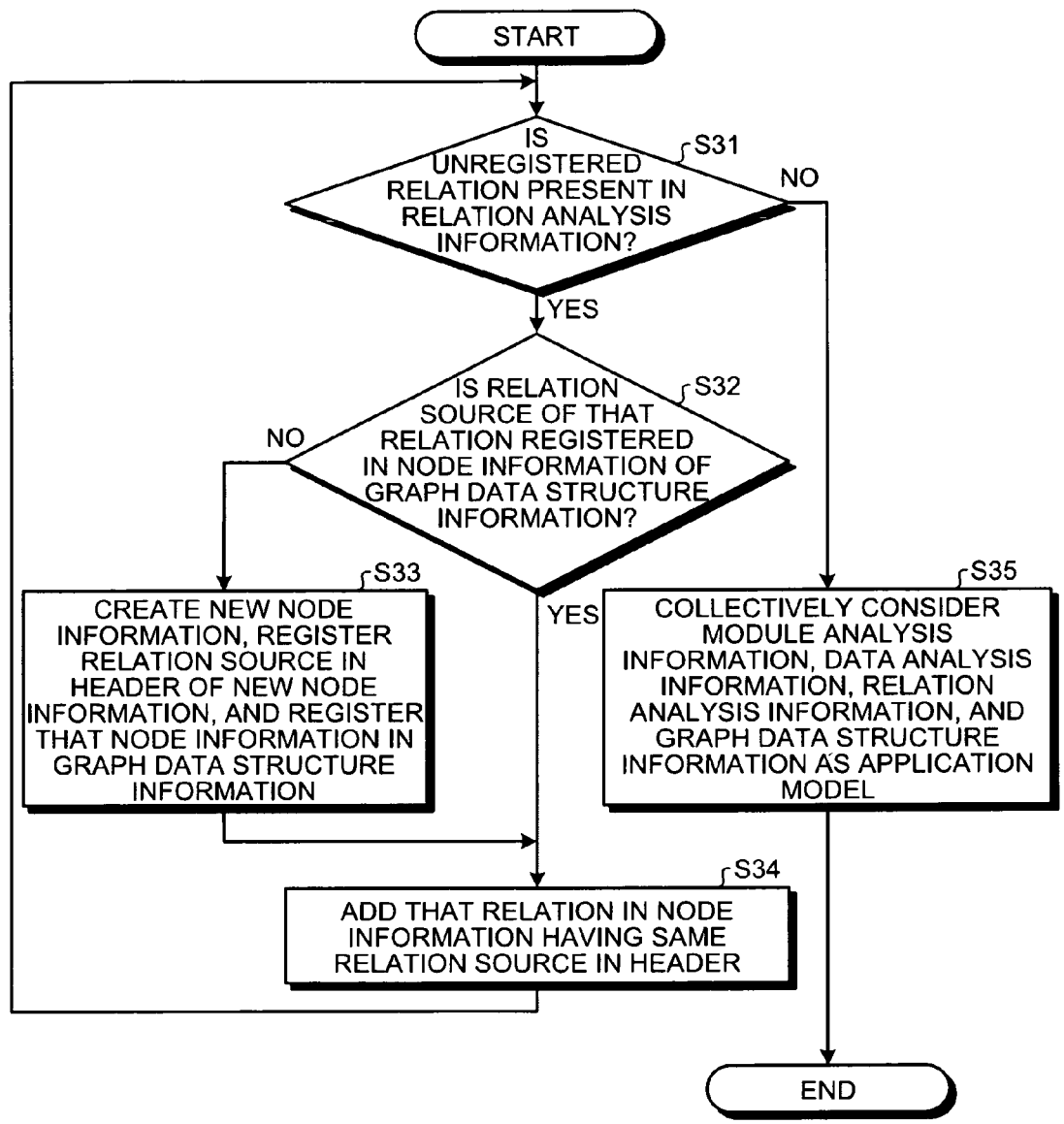
FIG. 22 is a flowchart for explaining a sequence of operations performed by the application model generating unit.

Given below is a sequence of operations performed by the application model generating unit 140. FIG. 22 is a flowchart for explaining a sequence of operations performed by the application model generating unit 140. As illustrated in FIG. 22, the application model generating unit 140 first determines whether an unregistered relation is present in the relation analysis information (Step S31).

If an unregistered relation is present in the relation analysis information, then the application model generating unit 140 determines whether the relation source of that particular relation is registered in the node information of the graph data structure information (Step S32). If that relation source is not registered in the node information, then the application model generating unit 140 creates new node information, registers that particular relation source in the header of the newly-created node information, and registers that node information in the graph data structure information (Step S33). Then, the application model generating unit 140 adds the particular relation in the node information having the same relation source in its header (Step S34) and returns to Step S31.

On the other hand, if no unregistered relation is present in the relation analysis information, then the application model generating unit 140 collectively stores the module analysis information, the data analysis information, the relation analysis information, and the graph data structure information as the application model in the application model storing unit 150 (Step S35).

In this way, since the application model generating unit 140 generates the graph data structure information based on the relation analysis information, the application can be represented in a graphic form.

Figure 23:
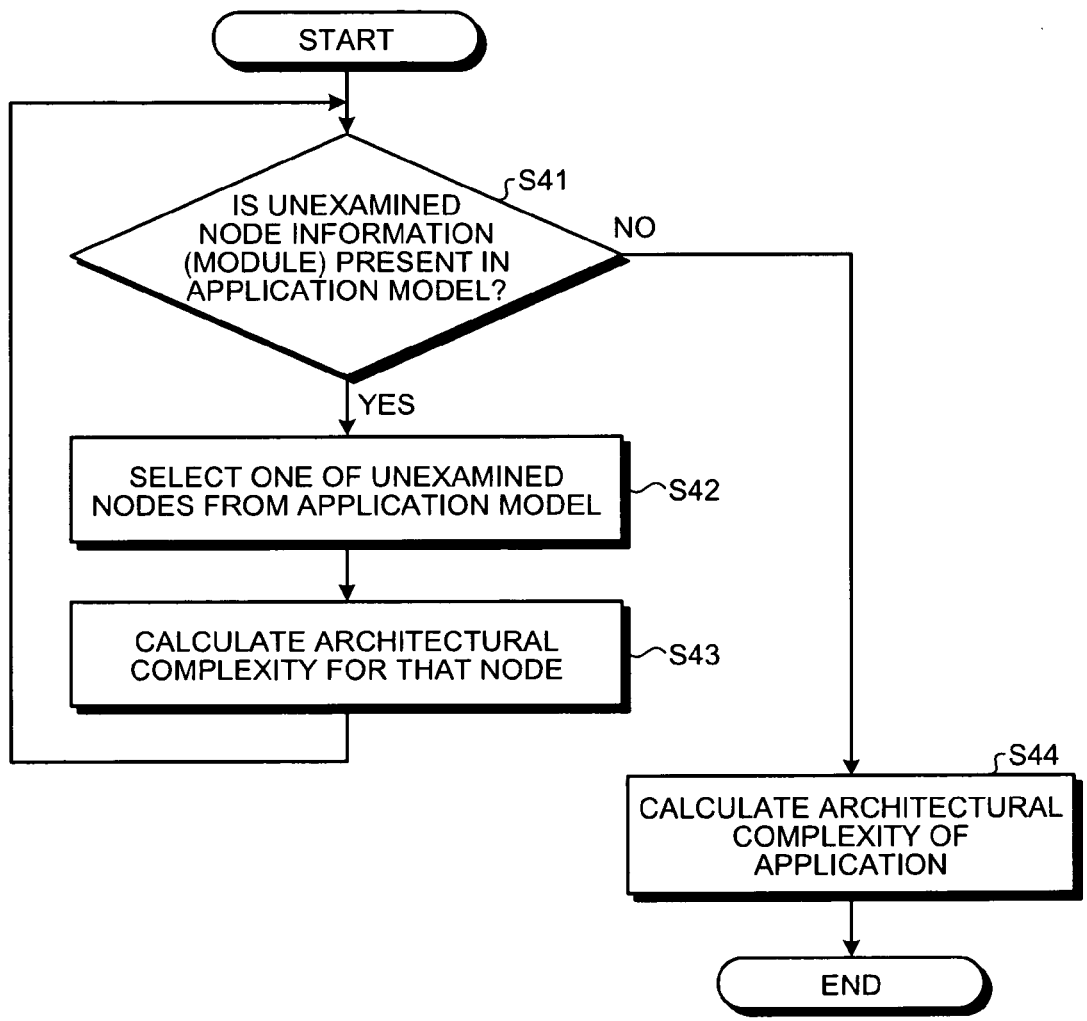
FIG. 23 is a flowchart for explaining a sequence of operations performed by an architectural complexity evaluating unit.

Given below is a sequence of operations performed by the architectural complexity evaluating unit 160. FIG. 23 is a flowchart for explaining a sequence of operations performed by the architectural complexity evaluating unit 160. As illustrated in FIG. 23, the architectural complexity evaluating unit 160 determines whether unexamined node information is present in the application model (Step S41). However, in this case, only the module nodes are taken into consideration.

If unexamined node information is present, then the architectural complexity evaluating unit 160 selects one of the unexamined nodes (Step S42) and calculates the architectural complexity, that is, calculates the Impact Scale for that node (Step S43). Then, the architectural complexity evaluating unit 160 returns to Step S41 and performs identical processing on the subsequent unexamined node. On the other hand, if no unexamined node information is present, then the architectural complexity evaluating unit 160 adds the architectural complexity for each node and calculates the architectural complexity of the application (Step S44).

In this way, since the architectural complexity evaluating unit 160 calculates the architectural complexity of the application model, the complexity of the application can be evaluated at the architecture level.

Figure 24:
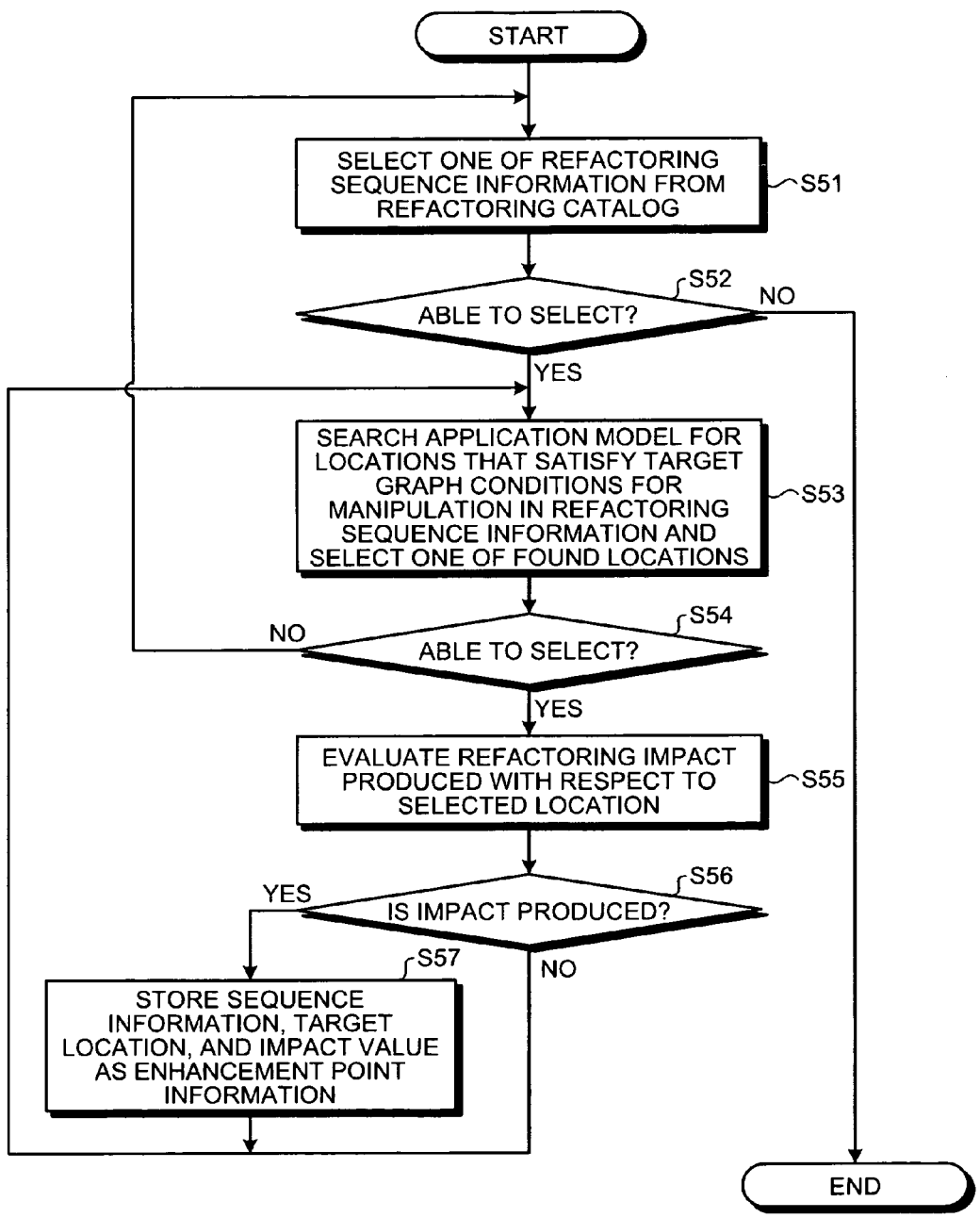
FIG. 24 is a flowchart for explaining a sequence of operations performed by the enhancement point searching unit.

Given below is a sequence of operations performed by the enhancement point searching unit 170. FIG. 24 is a flowchart for explaining a sequence of operations performed by the enhancement point searching unit 170. As illustrated in FIG. 24, the enhancement point searching unit 170 attempts to select one of the refactoring sequence information from the refactoring catalog 171 (Step S51). Then, the enhancement point searching unit 170 determines whether it could select the refactoring sequence information (Step S52). If it could not select the refactoring sequence information, then the enhancement point searching unit 170 exits the processing because of the fact that the processing regarding all refactoring sequence information is completed.

On the other hand, if it could select the refactoring sequence information, then the enhancement point searching unit 170 searches for the graph of the application model and attempts to select one of the locations that satisfy the target graph conditions for manipulation in the selected refactoring sequence information (Step S53). Then, the enhancement point searching unit 170 determines whether it could select a location satisfying the target graph conditions for manipulation (Step S54). If it could not select any such location, then the enhancement point searching unit 170 returns to Step S51 because of the fact that the processing on the selected refactoring sequence information is completed and then attempts to select subsequent refactoring sequence information.

On the other hand, if it could select a location satisfying the target graph conditions for manipulation, then the enhancement point searching unit 170 evaluates the refactoring impact produced with respect to the selected location (Step S55). The refactoring impact is measured by the change in the architectural complexity, that is, the change in the Impact Scale before and after implementing the graph manipulation procedure corresponding to the selected refactoring sequence information. Greater the reduction in the architectural complexity, greater the refactoring impact; while smaller the reduction in the architectural complexity, smaller the refactoring impact. Meanwhile, an increase in the architectural complexity indicates that no refactoring impact could be produced.

Subsequently, the enhancement point searching unit 170 determines whether refactoring impact was produced (Step S56) and returns to Step S53 if no refactoring impact is determined to have been produced. If refactoring impact is determined to have been produced, then the enhancement point searching unit 170 stores the refactoring ID, the location, and the impact value (reduced value of the architectural complexity) of the selected refactoring sequence information as the enhancement point information in the enhancement point information storing unit 180 (Step S57) and returns to Step S53.

In this way, since the enhancement point searching unit 170 searches the application model for the locations for enhancement with the use of the refactoring sequence information and, when refactoring impact is produced, considers the locations for enhancement as the enhancement points, it becomes possible to automatically extract the enhancement points.

Figure 25:
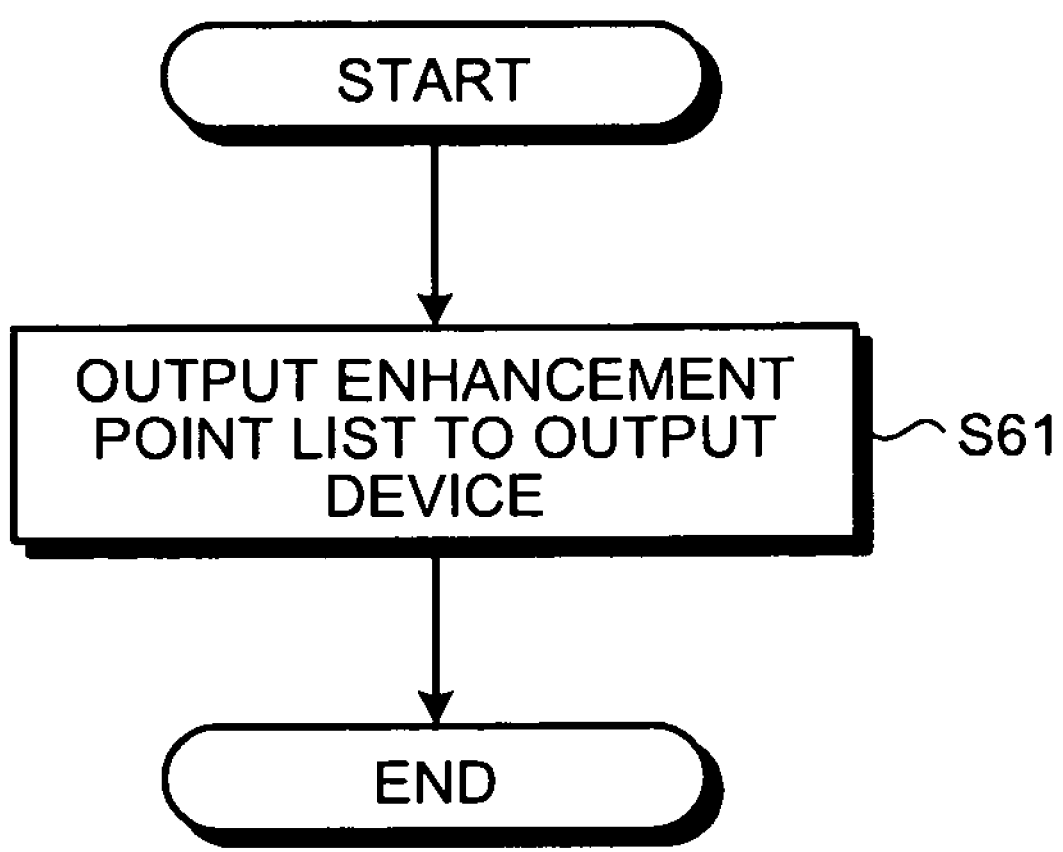
FIG. 25 is a flowchart for explaining a sequence of operations performed by an enhancement point list output unit.

FIG. 25 is a flowchart for explaining a sequence of operations performed by the enhancement point list output unit 190. As illustrated in FIG. 25, the enhancement point list output unit 190 reads the enhancement point information from the enhancement point information storing unit 180 and outputs the enhancement point list 20 to an output device (Step S61).

As described above, in the present embodiment, the control flow analyzing unit 110 analyzes the control structure of an application. The data dependency analyzing unit 120 analyzes the data dependency structure of the application. The application model generating unit 140 generates an application model by referring to the analysis result obtained by the control flow analyzing unit 110 and the data dependency analyzing unit 120, and to the source code 10. The enhancement point searching unit 170 searches the application model for enhancement points, which enable reduction in the architectural complexity, with the use of the refactoring sequence information and stores the enhancement point information in the enhancement point information storing unit 180. The enhancement point list output unit 190 outputs the enhancement point list 20. Such a configuration enables providing support to the enhancement of the application at the architecture level.

Figure 26:
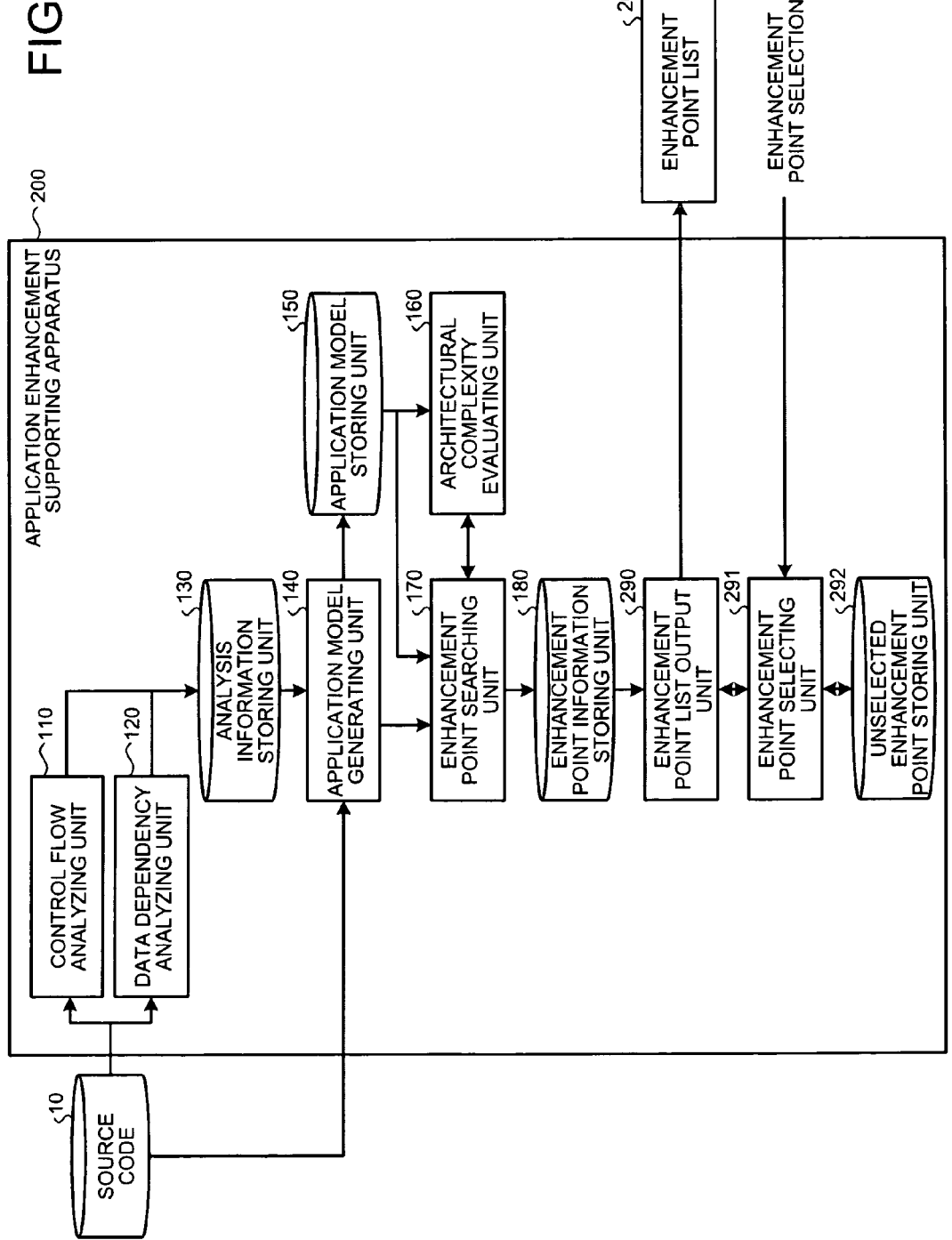
FIG. 26 is a functional block diagram of an application enhancement supporting apparatus that can utilize, during a subsequent search of enhancement points, an evaluation result produced by a refactoring operator.

The description according to the present embodiment is given for an application enhancement supporting apparatus that outputs the enhancement point list 20. In addition, an application enhancement supporting apparatus can also be configured to utilize, during the subsequent search of enhancement points, the evaluation result created by the refactoring operator corresponding to the enhancement point list 20 that was output. FIG. 26 is a functional block diagram of an application enhancement supporting apparatus that can utilize, during the subsequent search of enhancement points, the evaluation result produced by the refactoring operator.

In comparison with the application enhancement supporting apparatus 100 illustrated in FIG. 2, an application enhancement supporting apparatus 200 illustrated in FIG. 26 includes an enhancement point list output unit 290 in place of the enhancement point list output unit 190, and additionally includes an enhancement point selecting unit 291 and an unselected enhancement point storing unit 292.

The enhancement point selecting unit 291 is a processing unit that receives the input of selection/non-selection performed by the refactoring operator with respect to the enhancement points output by the enhancement point list output unit 290 and, from among the enhancement points, stores in the unselected enhancement point storing unit 292 those enhancement points that were not actually selected by the refactoring operator.

While outputting the subsequent enhancement point list 20, the enhancement point list output unit 290 appends information indicating "previously unselected" to the enhancement points stored in the unselected enhancement point storing unit 292 and lowers the priority of the previously-unselected enhancement points. The enhancement points that have been listed as non-target points for refactoring are either ill-fitted to the enhancement if changed or changes therein are not expected to produce an impact on enhancement. The task of taking such decisions places a certain burden on the refactoring operator. Thus, if such decision information is appended to the enhancement point list 20 at the time of subsequently outputting the enhancement point list 20, then that can contribute in reducing the burden on the refactoring operator.

Figure 27:
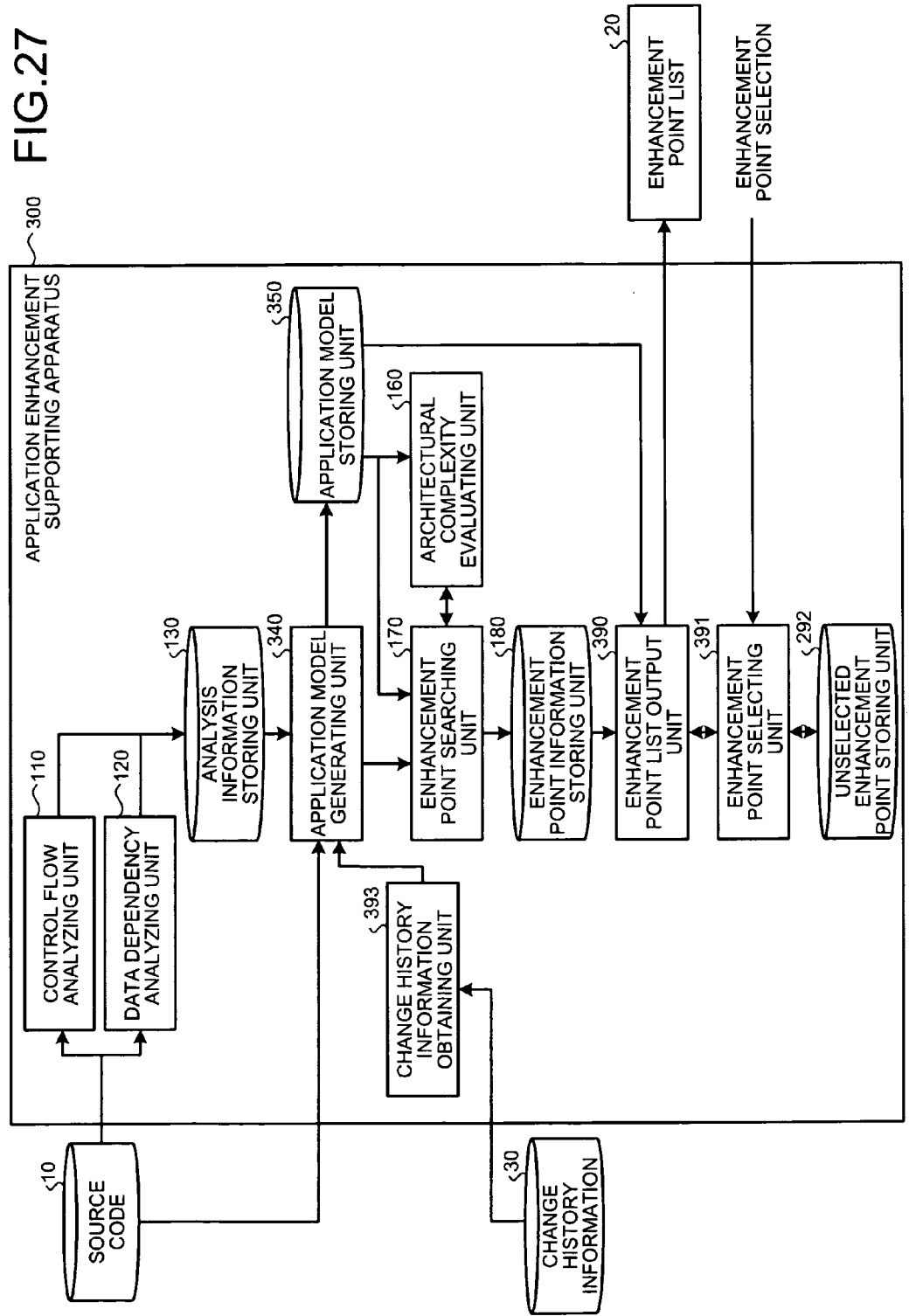
FIG. 27 is a functional block diagram of an application enhancement supporting apparatus in which non-selection information of enhancement points can be deleted in response to changes made to the source code.

However, if changes are made to the source code 10, then there rises a possibility that the enhancement points not selected previously by the refactoring operator now include newly selectable enhancement points. Thus, if changes are made to the source code 10, then it is necessary that, from among the unselected enhancement points stored in the unselected enhancement point storing unit 292, those unselected enhancement points that correspond to the changes made to the source code 10 be deleted. FIG. 27 is a functional block diagram of an application enhancement supporting apparatus in which unselected enhancement points can be deleted from the unselected enhancement point storing unit 292 in response to changes made to the source code 10.

In comparison with the application enhancement supporting apparatus 200 illustrated in FIG. 26, an application enhancement supporting apparatus 300 illustrated in FIG. 27 includes an application model generating unit 340, an application model storing unit 350, an enhancement point list output unit 390, and an enhancement point selecting unit 391 in place of the application model generating unit 140, the application model storing unit 150, the enhancement point list output unit 290, and the enhancement point selecting unit 291, respectively, and additionally includes a change history information obtaining unit 393.

The change history information obtaining unit 393 obtains change history information 30 regarding the source code 10 and sends it to the application model generating unit 340. While generating the application model, the application model generating unit 340 appends the update date/time to each node based on the change history information 30 and then stores the application model in the application model storing unit 350. While outputting the subsequent enhancement point list 20, the enhancement point list output unit 390 notifies the update date/time for each node to the enhancement point selecting unit 391 and instructs deletion, from the unselected enhancement point storing unit 292, of the unselected enhancement points corresponding to the nodes that were updated after the refactoring operator had selected the intended enhancement points.

In this way, when changes are made to the source code 10, the unselected enhancement points corresponding to the changes made to the source code 10 are deleted from the unselected enhancement point storing unit 292 from among all unselected enhancement points that were not selected previously by the refactoring operator. Because of that, the previously-unselected enhancement points can be once again considered as candidate points for refactoring.

Moreover, since the update date/time is appended to each node and each link in the application model with the use of the change history information 30, the enhancement point list output unit can be configured to first lower the priority of the enhancement points corresponding to the nodes or the links that have not been updated for a long period of time and then output the enhancement point list 20. Regarding the nodes and the links that are not updated for a long period of time, it can be said that those nodes and links are stable. Thus, the enhancement point list 20 can be output after lowering the priority of the enhancement points corresponding to such stable nodes and links. Because of that, the refactoring operator can review the enhancement points in a more efficient manner.

Furthermore, there is a high possibility that a set of nodes or links having mutually close update date/time is logically unified. Thus, if there are enhancement points corresponding to the nodes or links having mutually close update date/time, then the enhancement point list output unit can be configured to first raise the priority of those enhancement points and then output the enhancement point list 20. Since the enhancement point list 20 is output after raising the priority of the enhancement points having a high possibility of logical unification, the refactoring operator can review the enhancement points in a more efficient manner.

Meanwhile, in the present embodiment, the description is given regarding the application enhancement supporting apparatus. However, by implementing the configuration of the application enhancement supporting apparatus with software, an application enhancement supporting program having identical functions can be created. Given below is the description of a configuration of a computer that executes the application enhancement supporting program. The application enhancement supporting program may be stored in a computer readable storage medium such as a digital versatile disk (DVD), and distributed in the form of a medium. In the following, the application enhancement supporting program is stored in a DVD, read out by a DVD drive, and installed in a computer.

Figure 28:
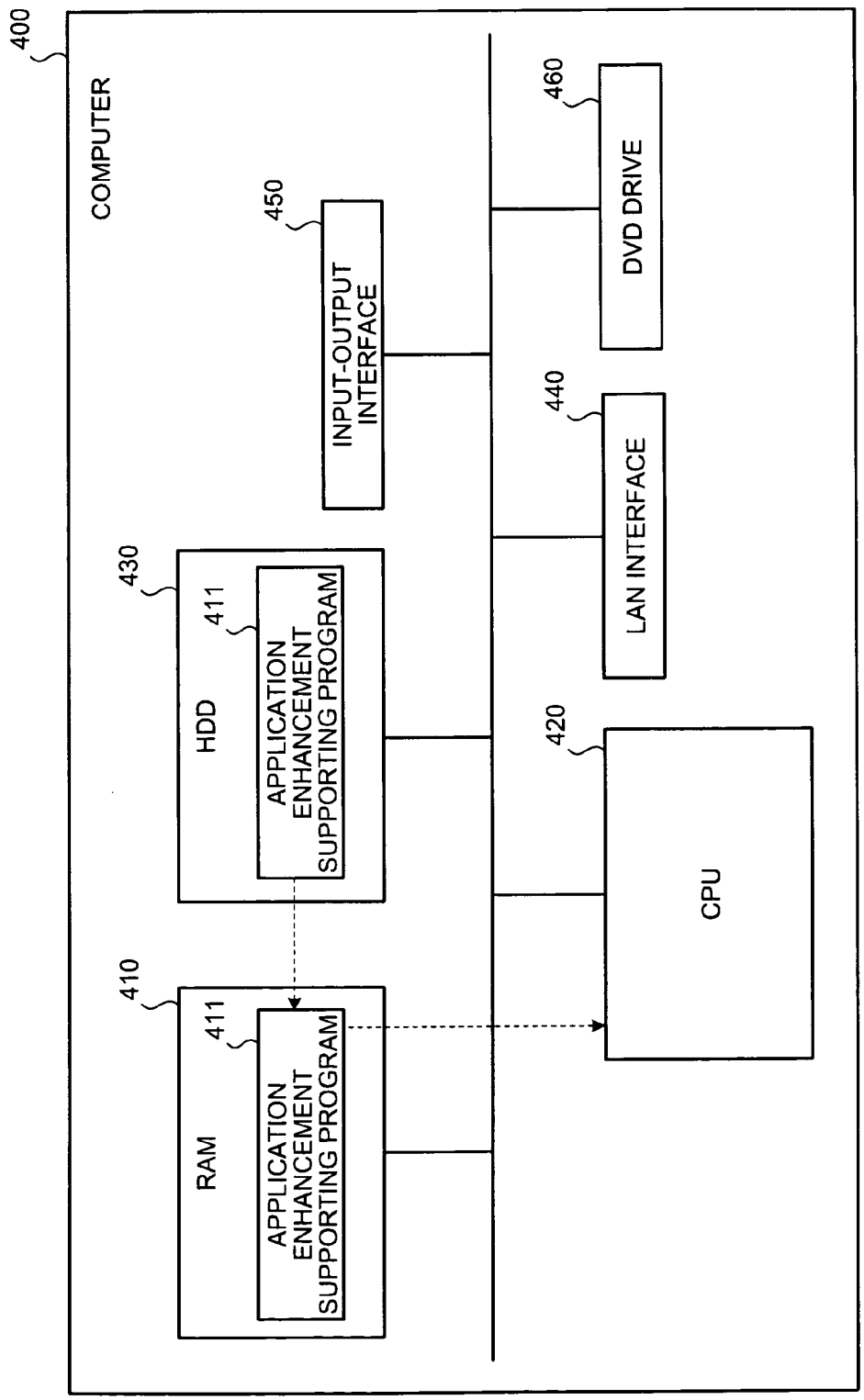
FIG. 28 is a functional block diagram of a configuration of a computer that executes an application enhancement supporting program according to the present embodiment.

FIG. 28 is a functional block diagram of a configuration of a computer that executes the application enhancement supporting program according to the present embodiment. As illustrated in FIG. 28, a computer 400 includes a random access memory (RAM) 410, a central processing unit (CPU) 420, a hard disk drive (HDD) 430, a local area network (LAN) interface 440, an input-output interface 450, and a digital versatile disk (DVD) drive 460.

The RAM 410 is a memory used to store programs or intermediate processing results of programs. The CPU 420 is a central processing unit that reads programs from the RAM 410 and executes them. The HDD 430 is a disk unit used to store programs or data. The LAN interface 440 is an interface for connecting the computer 400 to another computer via LAN. The input-output interface 450 is an interface for connecting an input unit such as a mouse or a keyboard and a display unit. The DVD drive 460 is a unit for reading data from a DVD or writing data to a DVD.

An application enhancement supporting program 411 that is to be executed in the computer 400 is stored in a DVD. The application enhancement supporting program 411 is then read from the DVD by the DVD drive 460 and installed in the computer 400. Alternatively, the application enhancement supporting program 411 can be stored in a database of another computer system that is connected via the LAN interface 440. In that case, the application enhancement supporting program 411 is read from that database and installed in the computer 400. Upon being installed, the application enhancement supporting program 411 is stored in the HDD 430 and loaded in the RAM 410. The CPU 420 then reads the application enhancement supporting program 411 and executes it.

According to an embodiment of the present invention, information can be provided for reducing the complexity of relations of connection between modules and data. Hence, support can be provided for the enhancement at the architecture level of an entire application.

According to an embodiment of the present invention, enhancement information can be provided by appropriately evaluating the complexity. Hence, the complexity of an application can be reduced in a reliable manner.

According to an embodiment of the present invention, enhancement points can be searched by graph manipulations. Hence, enhancement points can be extracted based on graph characteristics.

According to an embodiment of the present invention, enhancement points can be searched by simple graph manipulations. Hence, enhancement points can be extracted without difficulty.

According to an embodiment of the present invention, user decisions can be reflected in the output. Hence, the burden on a user can be reduced.

According to an embodiment of the present invention, if changes are made to the source code of locations corresponding to enhancement points that were not previously selected by the user, then it is possible to once again seek the decision regarding those enhancement points from the user. Hence, enhancement points can be appropriately extracted after changes are made to a source code.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A method comprising:
generating an application model that represents a relation of connection based on a control flow relation and a data dependency relation between a module and data constituting an application, by analyzing a source code;
evaluating complexity of the relation of connection that is represented by the application model generated in the generating; and
outputting an enhancement point used in reducing the complexity evaluated in the evaluating.

2. The method according to claim 1, wherein
the evaluating includes evaluating the complexity of the relation of connection using an Impact Scale, and
the outputting includes outputting an enhancement point used in enhancing the Impact Scale.

3. The method according to claim 1, wherein
the outputting further includes
manipulating a graph representing the application model in which the module and the data are represented as nodes and the relation of connection is represented as a link, and
evaluating complexity of the graph manipulated in the manipulating and, in case of reduction in the complexity, outputting as an enhancement point a manipulation performed in the manipulating.

4. The method according to claim 3, wherein the manipulating includes performing at least one of link deletion, link addition, node merging, and node division.

5. The method according to claim 1, further comprising
receiving an enhancement point selected by a user from among a plurality of enhancement points output in the outputting, and
the outputting includes outputting the enhancements points in a descending order of degree of reduction in complexity as a priority order and, if an enhancement point not received in the receiving is present, outputting non-received enhancement point by lowering priority thereof.

6. The method according to claim 5, further comprising
obtaining change history information regarding the source code, and
the outputting includes determining, based on the change history information, whether a change related to an enhancement point not received in the receiving is made after an enhancement point selected by the user is received in the receiving and, if the change is made after, outputting non-received enhancement point without lowering priority thereof.

7. An apparatus comprising:
- an application model generating unit that generates an application model that represents a relation of connection based on a control flow relation and a data dependency relation between a module and data constituting an application, by analyzing a source code;
- a complexity evaluating unit that evaluates complexity of the relation of connection that is represented by the application model generated by the application model generating unit; and
- an enhancement point outputting unit that outputs an enhancement point used in reducing the complexity evaluated by the complexity evaluating unit.

8. The apparatus according to claim 7, wherein
the complexity evaluating unit evaluates the complexity of the relation of connection using an Impact Scale, and
the enhancement point outputting unit outputs an enhancement point used in enhancing the Impact Scale.

9. The apparatus according to claim 7, further comprising
an enhancement point searching unit that manipulates a graph representing the application model in which the module and the data are represented as nodes and the relation of connection is represented as a link, and that evaluates complexity of the graph manipulated and, in case of reduction in the complexity, outputs as an enhancement point a manipulation performed.

10. The apparatus according to claim 9, wherein the enhancement point searching unit performs at least one of link deletion, link addition, node merging, and node division.

11. The apparatus according to claim 7, further comprising
an enhancement point selecting unit that receives an enhancement point selected by a user from among a plurality of enhancement points output by the enhancement point outputting unit, and
the enhancement point outputting unit outputs the enhancements points in a descending order of degree of reduction in complexity as a priority order and, if an enhancement point not received by the enhancement point selecting unit is present, outputs non-received enhancement point by lowering priority thereof.

12. The apparatus according to claim 11, further comprising
a change history information obtaining unit that obtains change history information regarding the source code, and
the enhancement point outputting unit determines, based on the change history information, whether a change related to an enhancement point not received by the enhancement point selecting unit is made after an enhancement point selected by the user is received by the enhancement point selecting unit and, if the change is made after, outputs non-received enhancement point without lowering priority thereof.

13. A computer readable storage medium having stored therein an application enhancement supporting program causing a computer to execute a process comprising:
- generating an application model that represents a relation of connection based on a control flow relation and a data dependency relation between a module and data constituting an application, by analyzing a source code;
- evaluating complexity of the relation of connection that is represented by the application model generated in the generating; and
- outputting an enhancement point used in reducing the complexity evaluated in the evaluating.

14. The computer readable storage medium according to claim 13, wherein
the evaluating includes evaluating the complexity of the relation of connection using an Impact Scale, and
the outputting includes outputting an enhancement point used in enhancing the Impact Scale.

15. The computer readable storage medium according to claim 13, wherein
the outputting further includes
manipulating a graph representing the application model in which the module and the data are represented as nodes and the relation of connection is represented as a link, and
evaluating complexity of the graph manipulated in the manipulating and, in case of reduction in the complexity, outputting as an enhancement point a manipulation performed in the manipulating.

16. The computer readable storage medium according to claim 15, wherein the manipulating includes performing at least one of link deletion, link addition, node merging, and node division.

17. The computer readable storage medium according to claim 13, wherein the process further comprises
receiving an enhancement point selected by a user from among a plurality of enhancement points output in the outputting, and
the outputting includes outputting the enhancements points in a descending order of degree of reduction in complexity as a priority order and, if an enhancement point not received in the receiving is present, outputting non-received enhancement point by lowering priority thereof.

18. The computer readable storage medium according to claim 17, wherein the process further comprises
obtaining change history information regarding the source code, and
the outputting includes determining, based on the change history information, whether a change related to an enhancement point not received in the receiving is made after an enhancement point selected by the user is received in the receiving and, if the change is made after, outputting non-received enhancement point without lowering priority thereof.

* * * * *

UNITED STATES PATENT AND TRADEMARK OFFICE
CERTIFICATE OF CORRECTION

PATENT NO. : 8,307,326 B2  
APPLICATION NO. : 12/656149  
DATED : November 6, 2012  
INVENTOR(S) : Kenichi Kobayashi et al.

It is certified that error appears in the above-identified patent and that said Letters Patent is hereby corrected as shown below:

Title Page Col. 2 (Other Publications); Line 2, Delete "IEIEC" and insert -- IEICE --, therefor.
Title Page Col. 2 (Other Publications); Line 10, Delete "IECE" and insert -- IEICE --, therefor.

Signed and Sealed this  
Seventh Day of May, 2013

Teresa Stanek Rea  
*Acting Director of the United States Patent and Trademark Office*